United States Patent
Dodge et al.

(10) Patent No.: US 7,312,720 B2
(45) Date of Patent: Dec. 25, 2007

(54) MULTI-LOOP TRANSMISSION SYSTEM

(75) Inventors: Carl Dodge, Houston, TX (US);
William G. Dillon, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 239 days.

(21) Appl. No.: 11/255,694

(22) Filed: Oct. 21, 2005

(65) Prior Publication Data

US 2006/0038699 A1    Feb. 23, 2006

Related U.S. Application Data

(63) Continuation-in-part of application No. 10/403,865, filed on Mar. 31, 2003, now Pat. No. 7,154,412.

(51) Int. Cl.
*G01V 3/00* (2006.01)
(52) U.S. Cl. .............................. 340/855.8; 340/853.3; 340/854.8; 340/855.9
(58) Field of Classification Search ............ 340/855.8, 340/854.8, 855.9, 853.1, 854.1, 855.1; 73/152
See application file for complete search history.

(56) References Cited

U.S. PATENT DOCUMENTS

| 3,459,956 A | * | 8/1969 | Brock .......................... 307/22 |
| 3,603,923 A | * | 9/1971 | Nelligan .................. 340/854.9 |
| 4,720,996 A | * | 1/1988 | Marsden et al. ......... 73/152.26 |
| 6,469,636 B1 | | 10/2002 | Baird et al. |

* cited by examiner

*Primary Examiner*—Jeffery Hofsass
*Assistant Examiner*—Sisay Yacob
(74) *Attorney, Agent, or Firm*—Conley Rose, P.C.

(57) ABSTRACT

A transmission system between a voltage source and a wireline tool comprising a first loop to transmit a signal between the voltage source and the wireline tool. The first loop has a first transformer coupled to the voltage source. The system also comprises a second loop, electrically independent of the first loop, to transmit the signal between the voltage source and the wireline tool. The second loop has a second transformer coupled to the voltage source. If the first loop fails, the first transformer is isolated from the voltage source.

28 Claims, 14 Drawing Sheets

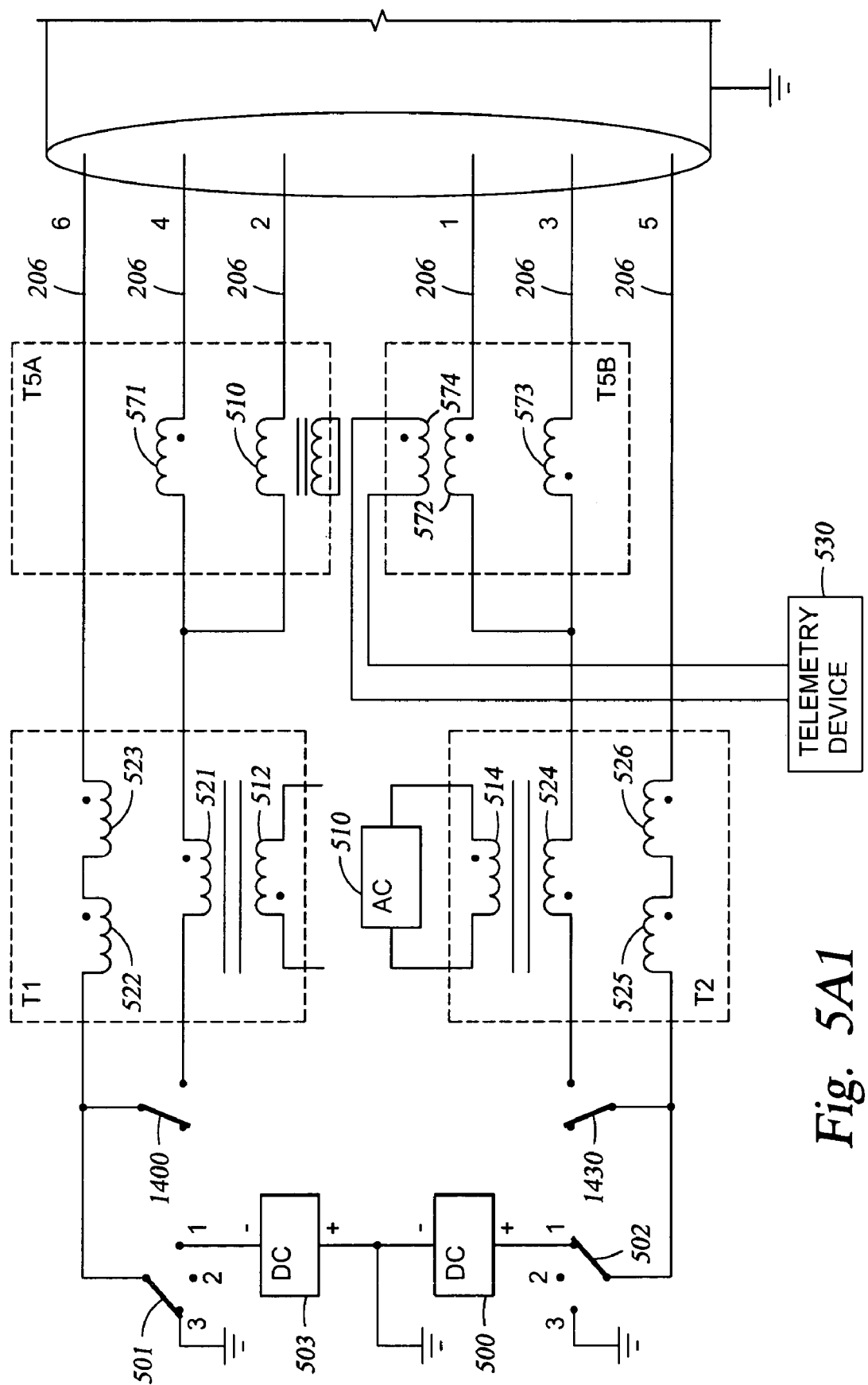
Fig. 5A1

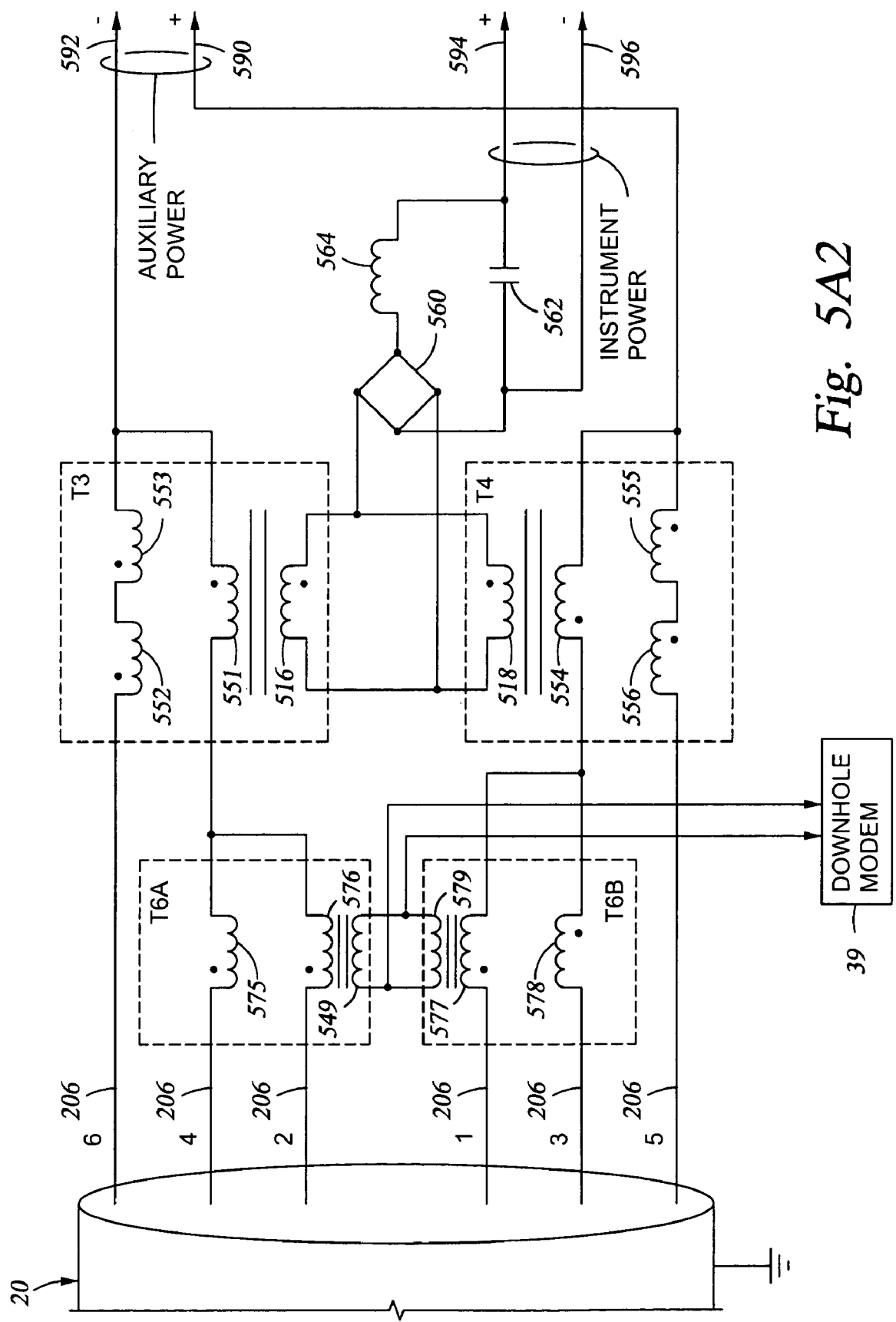
Fig. 5A2

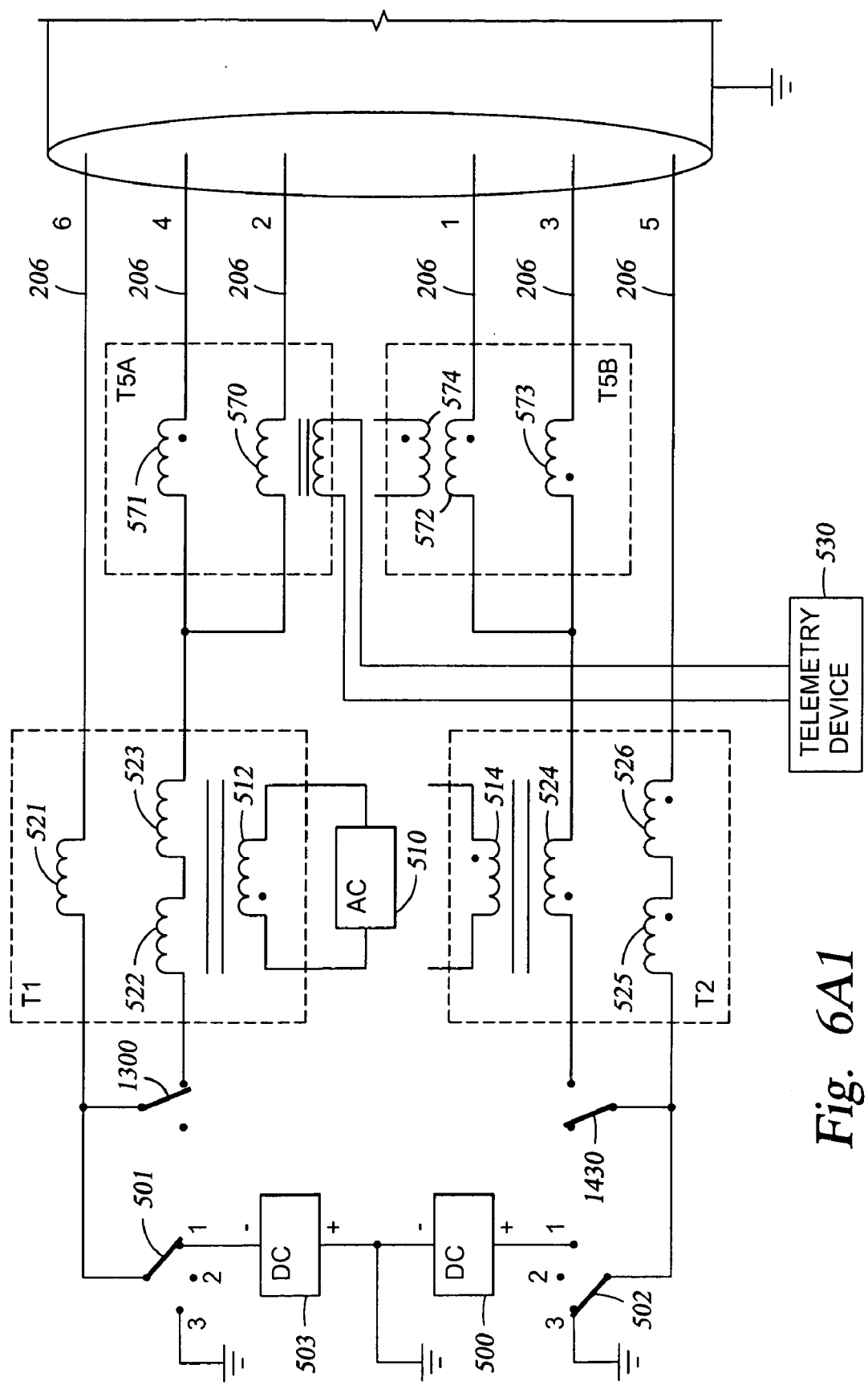
Fig. 6A1

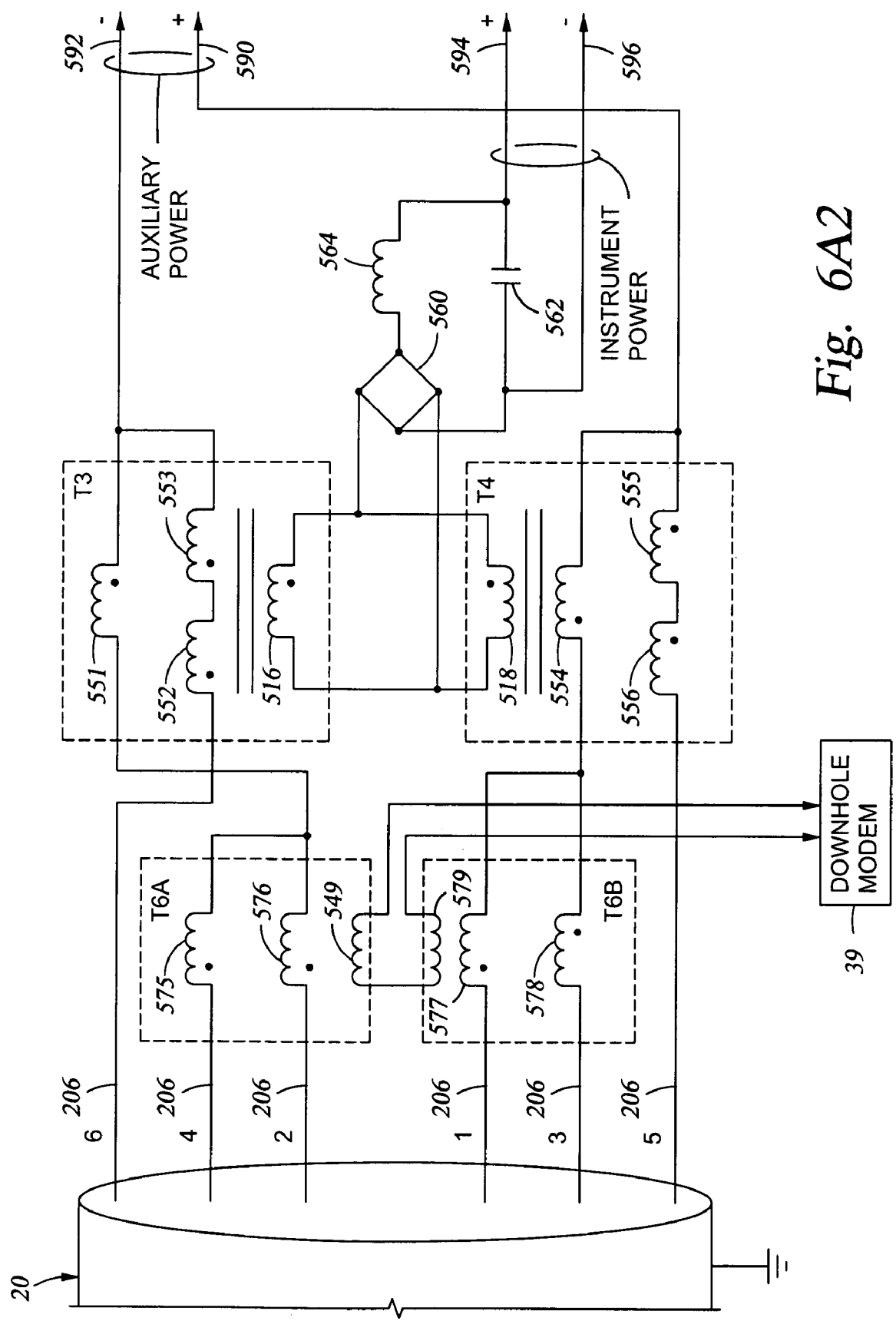
Fig. 6A2

MULTI-LOOP TRANSMISSION SYSTEM

CROSS-REFERENCE TO RELATED APPLICATIONS

This application is a Continuation-in-Part of the commonly-assigned, application entitled "High-Power Well Logging Method and Apparatus," Ser. No. 10/403,865, filed on Mar. 31, 2003, now U.S. Pat. No. 7,154,412 and incorporated herein by reference.

BACKGROUND OF THE INVENTION

It is often desirable to survey or "log" the formations surrounding a borehole by passing a logging sonde or well logging tool through the borehole to measure the parameters or characteristics of the formations at various depths within the borehole. The logging tool is passed through the borehole using a wireline cable which supplies electrical power to the logging tool and transmits telemetry signals between the surface and the logging tool. The logging tool collects data and other information as it passes through the borehole and transmits the data and information to the surface for further processing and analysis.

One popular multiconductor wireline cable comprises six insulated conductors wrapped around a seventh, central insulated conductor. This assembly is encased within two counter-wound layers of steel armor wires which protect the interior conductors and carry the weight of the cable and sonde. Such an assembly may be used to transfer power to logging tools downhole while providing the capability for bi-directional, full-duplex telemetry between the tools and a computer at the surface. However, if one of these conductors develops electrical leakage to armor (or opens such that it can no longer pass current), then the assembly becomes unstable and fails to transfer the required power to the tools downhole. The telemetry system also may fail to accurately transmit and receive data. Thus, there is a need for a power delivery system for wireline logging that is capable of continued power and data delivery even if part of the system has been damaged.

BRIEF DESCRIPTION OF THE DRAWINGS

For a detailed description of preferred embodiments of the invention, reference will now be made to the accompanying drawings wherein:

FIGS. 5A-5C show the surface and downhole equipment of FIGS. 3A and 3B configured such that a failed loop is isolated and a remaining loop carries power and data uphole and/or downhole, in accordance with embodiments of the invention;

FIGS. 6A-6C show a variation of the surface and downhole equipment configurations shown in FIGS. 5A-5C, in accordance with embodiments of the invention;

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "switch" encompasses manually-operated switches, relay switches, switch matrices, transistors, diodes, and other circuit logic that may be used to regulate current flow. Further, in at least some embodiments, the term "power" encompasses data transmission, instrument power transmission, and auxiliary power transmission.

DETAILED DESCRIPTION OF PREFERRED EMBODIMENTS

As described in detail below, embodiments of the invention comprise a well logging system having a cable with multiple conductors housed inside the cable. The conductors are divided into multiple groups, where each group is used for the transfer of instrument power, auxiliary power and telemetry data between surface equipment and downhole equipment. The groups are in substantial electrical isolation from each other such that if any member of one of the groups is damaged and/or fails, that failed group is isolated from power and data sources and the surviving group(s) is still able to transfer power and data uphole and/or downhole.

Figure 1:
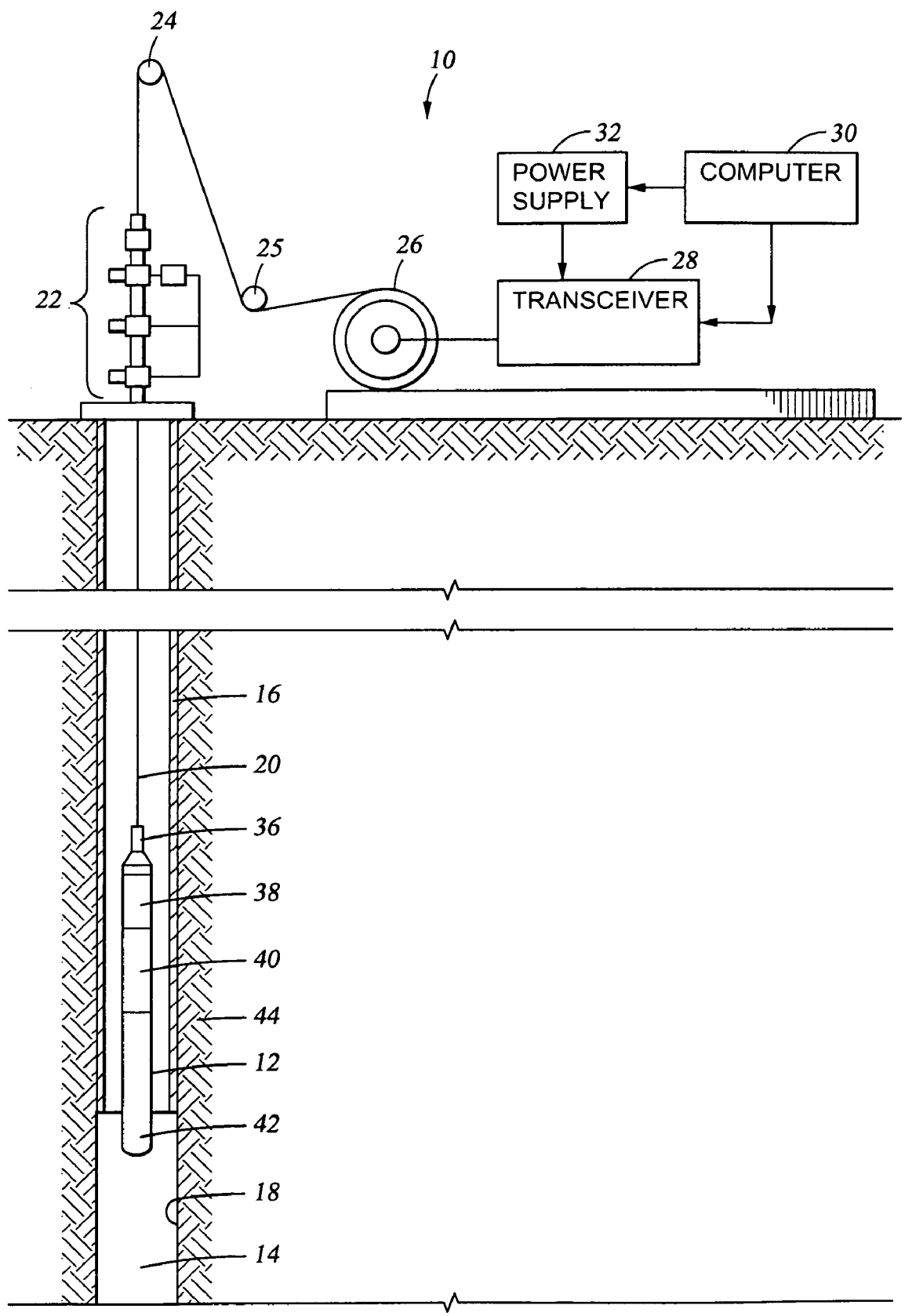
FIG. 1 shows a block diagram of a well logging system in accordance with embodiments of the invention.

Referring to FIG. 1, the well logging system 10 for at least some embodiments of the present invention comprises a well logging tool 12 lowered into a borehole 14 by way of a cable 20. The borehole 14 may be cased with concentric casing 16, or the borehole 14 may be an open borehole such as at 18. The cable 20 extends from the tool 12, through wellhead 22, around a first sheave 24 and around a second sheave 25 to a rotatable spool 26 for raising and lowering the cable 20 and tool 12.

The conductors in cable 20 are coupled to a transceiver 28. In some embodiments, the conductors in cable 20 are each coupled to a corresponding electrically conductive slip ring (not shown) on the spool axle. The conductive slip rings transfer electrical currents from the cable that rotates with the spool to corresponding electrically conductive brushes "riding" on the slip rings. The brushes are then coupled to the transceiver 28. In this manner, signals are transferred from the rotating spool to the stationary transceiver 28 with negligible degradation.

The transceiver 28 receives the logging data and information and in turn transmits the data and information to a computer or microprocessor 30. The computer 30 analyzes the logging data received from the downhole tool 12 and displays the logging information for the operator. The computer 30 may be further configured to provide control signals to transceiver 28 for communication to well logging tool 12. The cable 20 is also coupled via transceiver 28 to a power supply 32 for supplying power to the logging tool 12. In some embodiments, the power supply 32 is a programmable switching power supply capable of producing adjustable voltages and waveforms under the control of computer 30.

The well logging tool 12 may be any one of various types used for recording downhole data. The various embodiments of the present invention are not limited to a particular well logging tool. The well logging tool 12 comprises a cable head 36 with the upper portion of the tool 12 comprising suitable electronic circuitry for controlling the supply of power and the transmission of the signals to and from tool 12. Tool 12 comprises a motorized unit 40 and an instrument package 42 for collecting the data on the surrounding formation 44. Tool 12 communicates with surface equipment by way of telemetry and power extraction module (TPEM) 38.

In operation, the well logging tool 12 is passed downward through the cased section 16 of borehole 14 and into the open portion 18, and then retrieved from the borehole 14 by spooling the cable 20 onto the reel 26. As the well logging tool 12 passes through the borehole 14, information is collected on the characteristics of the formation 44 surrounding the borehole 14. Details pertaining to the cable 20 are now discussed.

Figure 2:
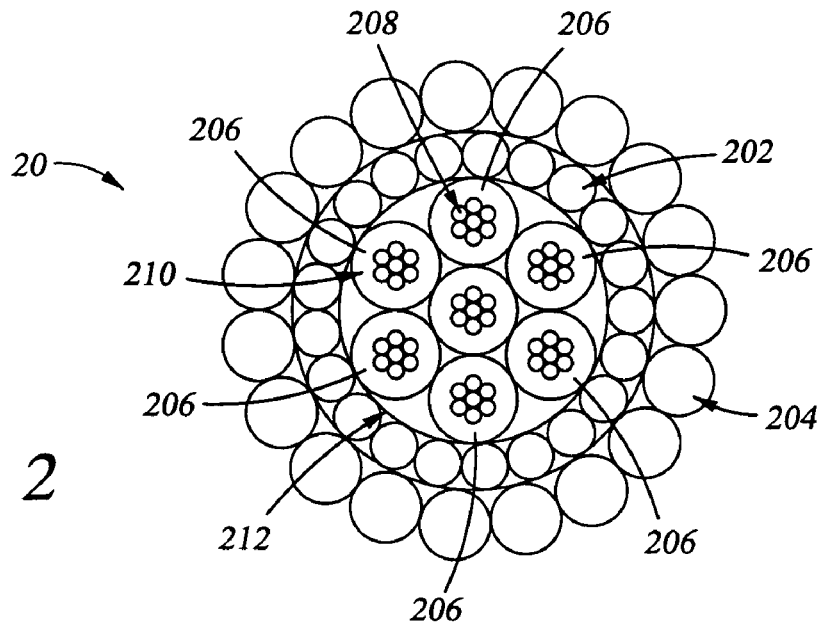
FIG. 2 shows a cross-sectional view of a 7-conductor cable, in accordance with embodiments of the invention.

In some embodiments, cable 20 is a seven-conductor logging cable as shown in the cross-sectional view of FIG. 2. Such a cable, or its equivalent, may be obtained from the Rochester Corp., such as the Rochester 7H464 15/32" diameter cable or the Rochester 7H472 "SLAMMER" cable. Electrical characteristics of such cables are shown in Table 1 below.

TABLE 1

| | |
|---|---|
| Electrical Insulation resistance | 1500 Mega-ohm/Kft. |
| Rated insulation breakdown voltage | 1100 VDC (1200 VDC for 7H464) |
| Conductor series resistance | 10 ohms/Kft. |
| Capacitance (any conductor to armor) | 40 to 50 pf/ft. (depends on temperature rating and the insulating material) |
| Capacitive and series electrical resistance | 4% variation maximum in electrical properties of outer 6 conductors |

Referring to FIG. 2, the cable 20 comprises two layers of contra-helically wound steel armor wires 202, 204 encasing seven electrical conductors 206. The steel armor wires 202, 204 are hereinafter collectively referred to as "armor." Each conductor 206 comprises a plurality of twisted copper strands 208 surrounded by insulation 210. The geometry of the electrical conductors 206 comprises six equal diameter outer conductors wrapped around a seventh central conductor. The six outer conductors are equally and circumferentially spaced. The seven conductors are wrapped with tape 212, around which resides the steel armor. The steel armor is conductive (about 1 ohm/1000 ft) and can, if desired, be used as an eighth electrical conductor. The steel armor is also ferromagnetic, and may be magnetically "marked" at regular intervals as a way of monitoring the downhole position of tool 12. Other suitable examples of cables 20 comprise cables with stainless steel armor, MP35 armor, or other armors which have higher armor resistances. These cables may be used for corrosive drilling environments (e.g., environments with considerable $H_2S$ and/or $CO_2$ concentrations). Power and data are transmitted and received uphole and/or downhole along the cable 20 using a power and data delivery system in accordance with embodiments of the invention. The power and data delivery system is now discussed.

Figure 3A:
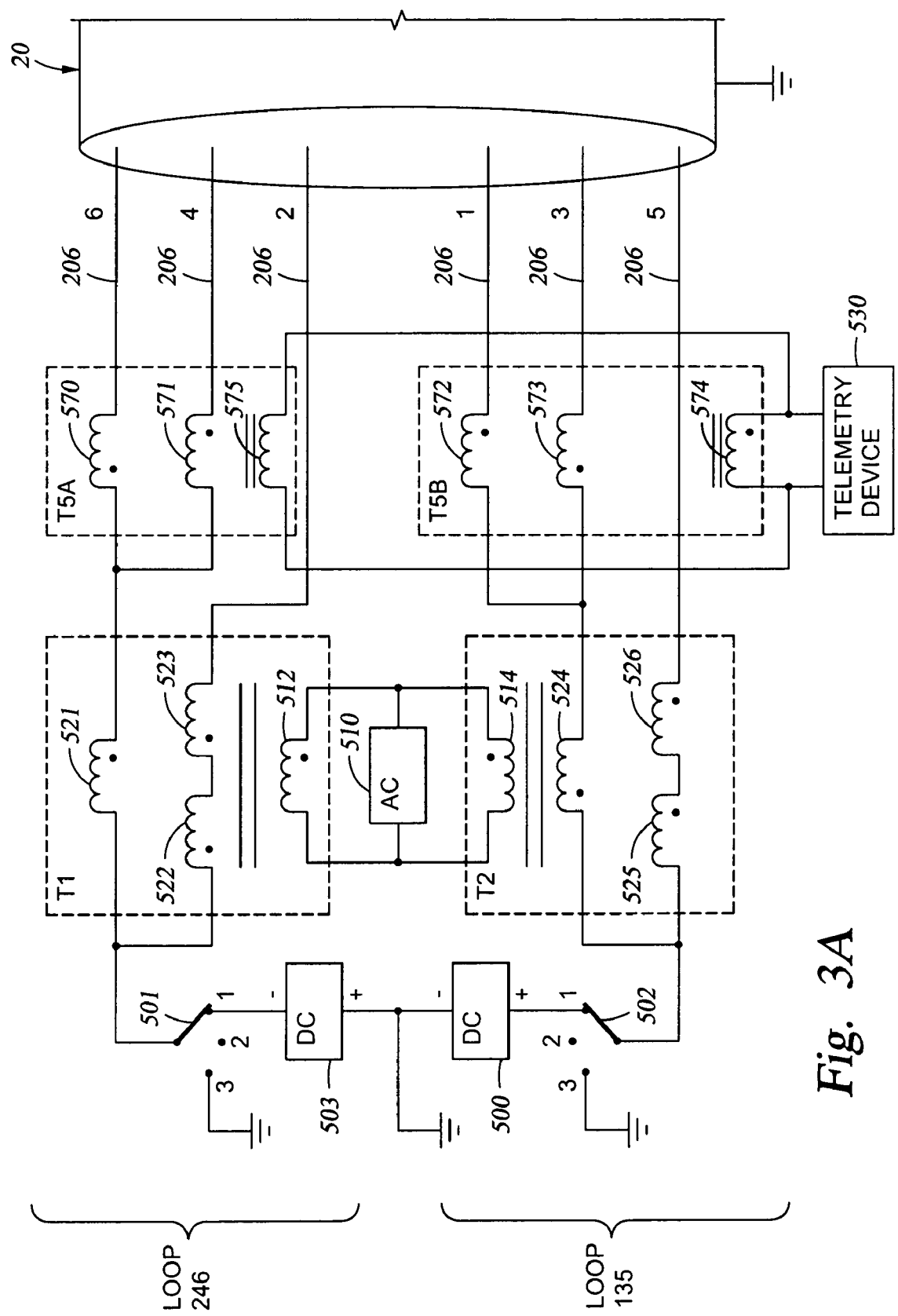
FIG. 3A shows surface equipment in accordance with embodiments of the invention.
Figure 3B:
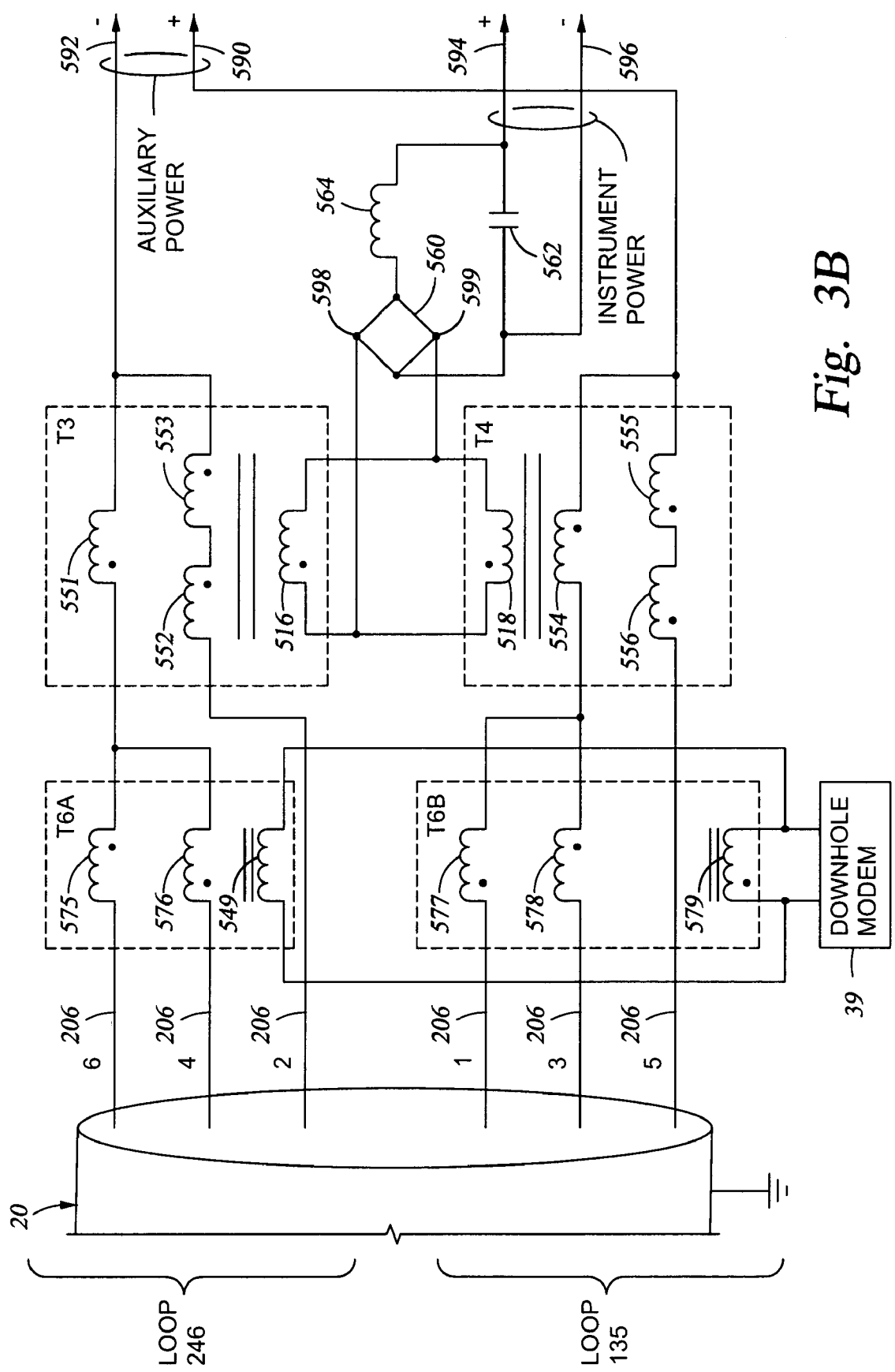
FIG. 3B shows downhole equipment in accordance with embodiments of the invention.

A power and data delivery system is shown in FIGS. 3A and 3B in accordance with at least some embodiments. The delivery system divides the six outer conductors 206 of the wireline cable 20 into two groups, each group comprising three conductors. Each group is in substantial electrical isolation from the other group such that certain voltages and currents carried on one group do not substantially affect the other group. The group also may be referred to as a "loop," since data may be transferred both uphole and downhole on a single loop. Because the loops are isolated from each other, one loop can still transfer power and data if the other loop fails. In this way, power and data redundancy is provided to the wireline system 10.

FIG. 3A shows a diagram of surface equipment 498 coupled to the logging cable 20. In at least some embodiments, the surface equipment 498 is housed within the transceiver 28. The equipment 498 comprises four transformers T1, T2, T5A and T5B, DC power sources 500, 503, an AC power source 510 (e.g., oscillating at a suitable frequency such as 200 Hz), and switches 501, 502. In at least some embodiments, the transformers described herein are multifilar transformers. The transformers T1 and T2 are coupled to the switches 501 and 502, respectively. The state of the switch 501 may be adjusted to couple the transformer T1 to the power source 503 (indicated as position "1"), to a suspended (i.e., non-electrical) node (indicated as position "2") such that no current flows between switch 501 and the transformer T1, or to ground (indicated as position "3"). Similarly, the switch 502 may be adjusted to couple the transformer T2 to the power source 500 (indicated as position "1"), to a suspended node (indicated as position "2") such that no current flows between switch 502 and the transformer T2, or to ground (indicated as position "3"). The switch 501 couples to the negative terminal of the power supply 503. The switch 502 couples to the positive terminal of the power supply 500. The positive terminal of power supply 503 and the negative terminal of power supply 500 each couple to a common node that is coupled to ground.

Transformers T1, T2 each comprise four windings, although the scope of disclosure is not limited as such. Transformer T1 comprises a 175 Volt (V) winding 521, as well as two additional 175 V windings 522, 523 coupled in series. In at least some embodiments, these and other windings are made in a multifilar manner so that each winding has the same number of turns and each windings is wrapped around a core in the same manner. Thus, each of the windings 521-523 has the same voltage induced therein by current in winding 512. The transformer T1 also comprises a 120 V winding 512. The winding 512 is magnetically coupled to the windings 521, 522, 523. As such, the winding 512 may excite the windings 521, 522, 523, and likewise, either or all of the windings 521, 522, 523 may excite the winding 512. The configuration of transformer T2 is similar to that of transformer T1. Specifically, transformer T2 comprises a 175 V winding 524, as well as two additional 175 V windings 525, 526 coupled in series. The transformer T2 also comprises a 120 V winding 514 which is magnetically coupled to the windings 524, 525, 526. The winding 514 may excite the windings 524-526 or be excited by any of the windings 524-526. The windings 512, 514 are coupled in parallel to the AC power source 510. Thus, the AC power source 510 imposes a voltage on the windings 512, 514. In turn, the windings 512, 514 may excite corresponding windings 521-526 in transformers T1, T2, respectively.

Transformer T1 is coupled to transformer T5A. Likewise, transformer T2 is coupled to transformer T5B. Each of the transformers T5A, T5B comprises three windings, although the scope of disclosure is not limited to any particular number of windings. Transformer T5A comprises windings 570, 571 and 575. Windings 570 and 571 have the same number of turns around the core and are wrapped around the core in the same manner so that currents in 575 induce voltages of substantially equal magnitude across windings 570 and 571. The voltages applied by the telemetry device 530 to the windings 574, 575 vary from +15 V to −15 V with discrete frequencies ranging from 8 KHz to 24 KHz, although the scope of disclosure is not limited as such. The voltages received by windings 574, 575 from downhole modem 39 vary in magnitude from 0.001 V to 1.0 V with discrete frequencies ranging from 32 KHz to 270 KHz. The cable 20 attenuates signals transmitted thereupon depending upon the frequency of the transmitted signal. The higher the frequency, the greater the attenuation. The winding 575 may excite the windings 570, 571 or be excited by the windings 570, 571. Similarly, transformer T5B comprises windings 572, 573 which may be excited by winding 574 or which may excite the winding 574. Multifilar windings 572, 573 are wrapped in the same manner around corresponding cores and comprise the same number of turns. Currents in winding 574 excite equal magnitude voltages in windings 572 and 573. Windings 570, 571 of transformer T5A are coupled to transformer T1, whereas the windings 572, 573 of transformer T5B are coupled to transformer T2. The windings 575, 574 of transformers T5A, T5B are coupled in parallel to a telemetry device (e.g., a voltage source) 530. The telemetry device 530 transmits and receives data along the cable 20.

Still referring to FIG. 3A, the cable 20 is shown comprising armor and six conductors 206 housed therein. Although the cable 20 comprises seven conductors 206, only the six outer conductors are shown so as to illustrate with clarity the power and data transmission techniques used by various embodiments. These six conductors 206 are labeled 1-6. Conductors 6, 4 are coupled to windings 570, 571 of transformer T5A, respectively. Conductor 2 is coupled to winding 523 of transformer T1. Similarly, conductors 1, 3 are coupled to windings 572, 573 of transformer T5B, respectively. Conductor 5 is coupled to winding 526 of transformer T2. Armor is coupled to the earth (i.e., electrical ground).

The components shown in FIG. 3A constitute at least part of the surface equipment 498 shown in FIG. 1. Power and data are transferred to and from the surface equipment 498 shown in FIG. 3A via the conductors 1-6. The conductors 1-6, housed within the armor of cable 20, also are coupled to downhole equipment, thus facilitating power and data transfer between surface and downhole equipment. The downhole equipment is now discussed in context of FIG. 3B.

Referring to FIG. 3B, there is shown downhole equipment 540 that, in at least some embodiments, is housed in the TREM 38. The conductors 1-6 shown in FIG. 3A couple to the surface equipment 498 on one end and the downhole equipment 540 on the other end. The downhole equipment 540 comprises four transformers T6A, T6B, T3 and T4, as well as additional circuit logic. Transformers T6A and T6B each comprise three windings. Waveforms imposed by the downhole modem 39 on the windings 549 and 579 vary in magnitude from +15 V to −15 V with frequencies ranging between 32 KHz and 270 KHz. The signals excited in windings 549, 579 by the telemetry device 530 ranges from 0.010 V to 1 V depending on cable length and have frequencies ranging from 8 KHz to 24 KHz. Transformer T6A comprises windings 575, 576 and a winding 549 magnetically coupled to the windings 575, 576. As is the case with transformers in the surface equipment 498, transformers T6A and T6B are multifilar transformers. Thus, windings 575 and 576 have the same number of turns and are wound around the core in the same manner so that current in winding 549 excites equal magnitude voltages across windings 575 and 576. The winding 549 may excite the windings 575, 576 or may be excited by the windings 575, 576. Similarly, the transformer T6B comprises windings 577, 578 magnetically coupled to a winding 579. Currents in winding 579 excite equal magnitude voltages across winding 577 and 578. The winding 579 may excite the windings 577, 578 or may be excited by the windings 577, 578. The windings 549, 579 are coupled in parallel to a downhole modem 39. The windings 575, 576 of transformer T6A are coupled to conductors 6, 4, respectively. The windings 577, 578 of transformer T6B are coupled to conductors 1, 3, respectively. Conductors 2, 5 are coupled to transformers T3, T4, the contents of which are now described.

Multifilar transformers T3, T4 each comprise four windings. Transformer T3 comprises three 75 V windings 551-553 and a 240 V winding 516 magnetically coupled to the windings 551-553. Currents in winding 516 excite equal magnitude voltages across windings 551-553. The winding 516 may excite the windings 551-553 or may be excited by the windings 551-553. Transformer T4 comprises three 75 V windings 554-556 and a 240 V winding 518 magnetically coupled to the windings 554-556. The winding 518 may excite the windings 554-556 or may be excited by the windings 554-556.

Still referring to FIG. 3B, nodes 590 and 592 form an auxiliary power repository to which downhole tools (e.g., motors) may be coupled to access auxiliary power. Node 590 indicates the positive terminal and node 592 indicates the negative terminal of the auxiliary power repository, although in some embodiments this polarity may be reversed. Nodes 594, 596 form an instrument power repository to which other downhole tools (e.g., measuring instruments) may be coupled to access instrument power. Node 594 indicates the positive terminal and node 596 indicates the negative terminal of the instrument power repository. Node 592 of the auxiliary power repository is coupled to windings 551, 553 of transformer T3. Node 590 of the auxiliary power repository is coupled to nodes 554, 555 of the transformer T4.

Node 594 of the instrument power repository is coupled to one end of a capacitor 562 (e.g., 20 micro-Farads) and a winding 564 (e.g., 0.5 Henry). The node 596 of the instrument power repository is coupled to the other end of the capacitor 562 and to a bridge rectifier 560. The bridge rectifier 560 and the winding 564 couple to each other. Nodes 598, 599 of the bridge rectifier 560 are coupled in parallel to windings 516, 518. The winding 564 and the capacitor 562 together comprise a low-pass filter which only allows voltages having frequencies below 50 Hz to pass through to the instrument repository. As described in further detail below, the bridge rectifier 560 is used to convert incoming AC voltages (e.g., 200 Hz) to DC voltages, and the low-pass filter is used to smooth out the resulting DC signal by removing noise and other undesirable elements.

Figure 4A:
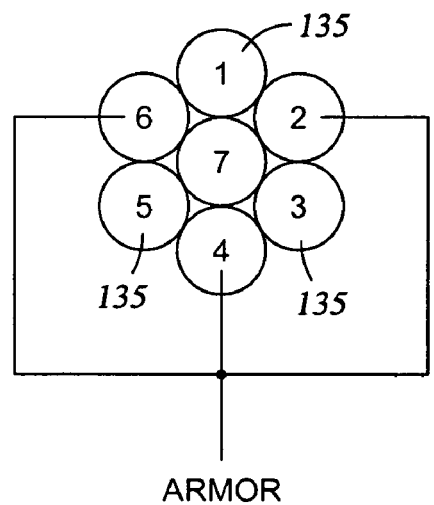
FIGS. 4A and 4B show cross-sectional views of the seven-conductor cable of FIG. 2 with the conductors grouped into separate loops, in accordance with embodiments of the invention.
Figure 4B:
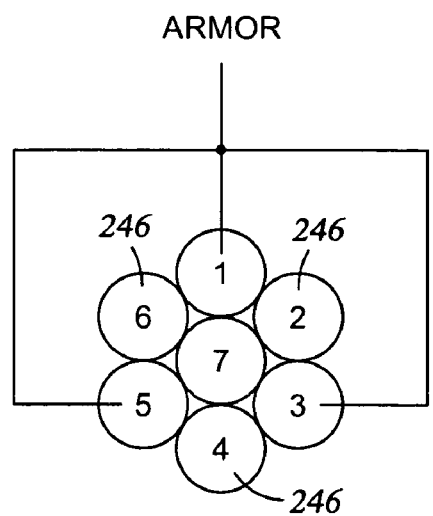

As previously mentioned, the conductors 206 of the cable 20 are grouped into two "loops" which are electrically isolated from each other such that if any conductor of one of the loops is damaged and ceases to function properly, the other loop remains functional and continues to carry power and data uphole and downhole. Referring to FIGS. 4A and 4B, conductors 1-6 are grouped into two loops. One of the two loops comprises conductors 2, 4 and 6 (hereinafter referred to as "loop 246"). The other loop comprises conductors 1, 3 and 5 (hereinafter referred to as "loop 135"). The scope of disclosure is not limited to any particular number of conductors and thus is not limited to grouping the conductors in any particular fashion. Auxiliary power, instrument power and telemetry data are transferred through some or all of the transformers T1, T5A, T6A and T3. The transformers are part of the loop 246. Auxiliary power, instrument power and telemetry data also are transferred through some or all of the transformers T2, T5B, T6B and T4, which are part of the loop 135.

Referring briefly to FIG. 4A, there is shown a cross-sectional view of the conductors 206 in the cable 20. Each of the conductors 1, 3 and 5 is positioned approximately the same distance from the middle conductor 7 and is positioned a substantially equal distance from the other two conductors in the loop 135. Loop 246 is coupled to armor for reasons described further below. Similarly, referring briefly to FIG. 4B, each of the conductors 2, 4 and 6 is positioned approximately the same distance from the middle conductor 7 and is positioned a substantially equal distance from the other two conductors in the loop 246. Loop 135 is coupled to armor for reasons described further below. The techniques by which power and data are transferred on the loops 135 and 246 are now discussed, followed by an explanation of what occurs when one of the loops 135, 246 fails.

Auxiliary power, instrument power and telemetry data can be transferred simultaneously uphole and/or downhole on each of the loops 135, 246. Simultaneous transmission of auxiliary power, instrument power and telemetry data is achieved by way of orthogonal transmission. In orthogonal transmission, the various transformers in the surface equipment 498 are used to encode the auxiliary power, instrument power and telemetry data onto the conductors 1-6 such that the auxiliary power, instrument power and telemetry data may be individually extracted (i.e., decoded) from the conductors 1-6 downhole. Similarly, data may be encoded downhole and extracted uphole.

A set of orthogonal vectors, sometimes known as eigenvectors, may be used to describe the encoding of the auxiliary power, instrument power and telemetry data onto the conductors 1-6. The same set of eigenvectors may be used to describe the extraction, or decoding, of the auxiliary power, instrument power and telemetry data from the conductors 1-6. A different eigenvector is used to describe the encoding and extraction of each of the auxiliary power, instrument power and telemetry data. Table 2 shows three exemplary vectors that may be used to encode and extract auxiliary power, instrument power and telemetry data. The scope of disclosure is not limited to this set of eigenvectors. Any suitable set of eigenvectors may be used.

TABLE 2

| Cable Conductor No. | Auxiliary Power Vector | Instrument Power Vector | Telemetry Data Vector |
|---|---|---|---|
| 1 | +1 | −1 | +1 |
| 2 | −1 | −2 | 0 |
| 3 | +1 | −1 | −1 |
| 4 | −1 | +1 | +1 |
| 5 | +1 | +2 | 0 |
| 6 | −1 | +1 | −1 |

As shown in the columns of Table 2, the vector <+1, −1, +1, −1, +1, −1> is used to describe the encoding and extraction of auxiliary power on the conductors 1-6. The first component of the vector, +1, corresponds to the signal weight to be applied to conductor 1, the second element −1 corresponds to relative magnitude of the signal to be applied to conductor 2, and so forth. The vector <−1, −2, −1, +1, +2, +1> is used to describe the encoding and extraction of instrument power on the conductors 1-6. The vector <+1, 0, −1, +1, 0, −1> is used to describe the encoding and extraction of telemetry data on the conductors 1-6. Imposing signal strengths in proportion to the magnitude and polarity of these vectors enable the auxiliary power, instrument power and telemetry data to be simultaneously transmitted on the same conductors 1-6 because these vectors are orthogonal to each other. For example, the dot product of the auxiliary power vector and the telemetry data vector is zero:

$$<+1, -1, +1, -1, +1, -1> \cdot <1, 0, -1, +1, 0, -1> =$$
$$1(1) + -1(0) + 1(-1) + -1(1) + 1(0) + -1(-1) = 0$$

Thus, auxiliary power signals encoded on each conductor with a magnitude and polarity according to the auxiliary power eigenvector of Table 2 does not affect telemetry data which has been encoded on the six conductors according to the telemetry data eigenvector of Table 2. For instance, assume that the telemetry device 530 fails and is no longer able to communicate with the modem 39 downhole. Accordingly, telemetry data ceases to be transmitted uphole or downhole. However, because the auxiliary power, instrument power and telemetry data are encoded using orthogonal vectors, a lack of telemetry data does not affect the transmission of auxiliary power and instrument power. In this way, orthogonal vectors are used to encode and extract power and data streams that are effectively "isolated" from each other.

The instrument power and telemetry data are encoded and extracted with the appropriate vectors by the various transformers in the surface equipment 498 and the downhole equipment 540. The auxiliary power is encoded and extracted without the use of a transformer. An example of the encoding and extraction process is now provided in context of FIGS. 3A and 3B. Assume that the surface equipment 498 transmits auxiliary power having a voltage amplitude of 500 V at the surface, instrument power having an amplitude of 100 V at the surface and telemetry data having an amplitude of 10 V at the surface. The DC power supplies 500, 503 each supply 250 V with respect to armor. In particular, supply 500 supplies +250 V with respect to armor while supply 503 provides −250 V with respect to armor. Because these two supplies are coupled, 500 V of auxiliary power results from the sum of the two supplies. The power supply 500 is the positive polarity and the power supply 503 is the negative polarity, as shown. Thus, the potential between the positive terminal of the power supply 500 and the negative terminal of the power supply 503 is +500 V. The auxiliary power is encoded onto the conductors 1-6 by virtue of these polarities. Specifically, the auxiliary power vector from Table 2 is:

<+1, −1, +1, −1, +1, −1>.

The first field in the vector, +1, corresponds to conductor 1. The third field in the vector, +1, corresponds to conductor 3. The fifth field in the vector, +1, corresponds to conductor 5. Referring to FIG. 3A, because conductors 1, 3 and 5 are coupled to the positive terminal of the power supply 500, they are encoded according to the auxiliary power vector.

Similarly, the second field in the vector corresponds to conductor 2, the fourth field in the vector corresponds to conductor 4, and the sixth field in the vector corresponds to conductor 6. Because conductors 2, 4 and 6 are coupled to the negative terminal of the power supply 503, they are encoded according to the auxiliary power vector. Thus, the auxiliary power comprising a potential difference at the surface of +500 V is encoded on the conductors 1-6 as:

<+250, −250, +250, −250, +250, −250>.

The AC power supply 510 encodes the instrument power onto the conductors 1-6 according to the instrument power vector of Table 2. Although the instrument power is different from the auxiliary power, both can be carried on the conductors 1-6 because the instrument power vector is orthogonal to the auxiliary power vector. Referring to Table 2, the instrument power vector is:

<−1, −2, −1, +1, +2, +1>.

The first field of the vector, −1, corresponds to conductor 1, the third field of the vector, −1, corresponds to conductor 3, and the fifth field of the vector, +2, corresponds to conductor 5. Referring to FIG. 3A, the winding 514 is used to excite the winding 524 to correspond to the first and third fields of the vector, since the first and third fields correspond to the conductors 1 and 3 which are coupled to the winding 524. Similarly, the winding 514 is used to excite the windings 525, 526 to correspond to the fifth field of the vector, since the fifth field corresponds to conductor 5 which is coupled to the windings 525, 526. The dots adjacent to the windings 514, 524, 525, 526 indicate that the dotted end of each winding will have the same polarity of voltage at any instant in time, whereas the non-dotted side of each winding will have the opposite polarity of voltage at the same instant in time. If the AC power supply 510 generates a voltage of +100 V, the winding 514 excites the winding 524 to an equal magnitude voltage. The non-dotted end of 524 is coupled to conductor 1 through winding 572 and to conductor 3 via winding 573. Thus, a voltage of −100 V with respect to the AC generated signal is applied to conductors 1 and 3. Similarly, the winding 514 excites the windings 525, 526 to an equal magnitude voltage of +100 V each. Because the dotted end of winding 525 is coupled to the non-dotted end of 526, the voltages generated in each winding are summed, and a voltage of +200 V (i.e., (+100 V)+(+100 V)) with respect to the AC generated voltage is applied to conductor 5.

Referring to transformer T1, the same voltage of +100 V that was applied to 514 is also impressed upon the winding 512 by the AC power supply 510. In turn, the winding 512 excites the windings 521, 522 and 523. The dotted end of winding 521 is coupled to conductor 6 via winding 570 and is also coupled to conductor 4 via winding 571. Thus, a voltage of +100 V relative to the AC generated signal is applied to conductors 4 and 6. Since the non-dotted end of winding 522 couples to the dotted end of winding 523, the voltages generated in each winding are summed, and a voltage of −200 V (i.e., (−100 V)+(−100 V)) with respect to the AC generated voltage is applied to conductor 2. As mentioned above, both auxiliary power and instrument power may be encoded onto the conductors 1-6 because the auxiliary power vector is orthogonal to the instrument power vector. Accordingly, the instrument power comprising +100 V is encoded on the conductors 1-6 as:

<−100, −200, −100, +100, +200, +100>.

The instrument power has been applied to the cable 20 using two substantially identical multifilar transformers T1 and T2. T1 has applied potentials to conductors 2, 4 and 6 independent of the operation of T2. T2 has applied substantially the same potentials to conductors 1, 3 and 5 independent of the operation of T1.

The transformers T5A and T5B are used to encode telemetry data onto the conductors 1-6 in accordance with the telemetry data vector. Referring to Table 2, the telemetry data vector is:

<+1, 0, −1, +1, 0, −1>.

The first field of the vector (+1) corresponds to conductor 1, the third field of the vector (−1) corresponds to conductor 3, and the fifth field of the vector (0) corresponds to conductor 5. Referring to FIG. 3A, the winding 574 of transformer T5B is excited by the telemetry device 530 to +10 V. In turn, the winding 574 excites the windings 572, 573 to voltages of the same magnitude (i.e., +10 V). The dotted end of winding 573 is coupled to the undotted end of winding 572 on one side and the undotted end of winding 573 couples to wireline conductor 3 on the other side. Thus, a voltage of −10 V with respect to the polarity of the generated telemetry signal 530 is applied to conductor 3. The dotted end of winding 572 couples to conductor 1. Thus, a signal of +10 V is applied to conductor 1 with respect to the telemetry device 530. The conductor 5 does not pass through the telemetry transformer and thus does not have any telemetry signal imposed on it. The +10 V telemetry signal provided to the winding 574 is also applied across winding 575. In turn, the winding 575 excites equal magnitude voltages across the windings 570 and 571 of +10 V. The dotted end of winding 570 couples to the non-dotted end of winding 571. The non-dotted end of 570 couples to conductor 6 so that a signal of −10 V with respect to the signal from the telemetry device 530 is imposed upon the conductor 6. The dotted end of winding 571 couples to conductor 4 so that a signal of +10 V with respect to the telemetry device 530 signal is impressed on conductor 4. Conductor 2 does not pass through transformers T5A, T5B, so it is not excited by the telemetry device 530. Thus, the telemetry device 530 excites the conductors 1-6 with 10 V as:

<+10, 0, −10, +10, 0, −10>.

Telemetry data has been imposed by transformer T5A across conductors 4 and 6 independent of the operation of T5B. Likewise, telemetry transformer T5B has imposed telemetry signals across conductors 1 and 3 independent of the operation of T5A. Telemetry data may be transmitted simultaneously with auxiliary power and instrument power because this vector is orthogonal to those used to encode the auxiliary power and the instrument power.

To summarize, the auxiliary power is encoded onto the conductors 1-6 as:

<+250, −250, +250, −250, +250, −250>. (1)

The instrument power is encoded onto the conductors 1-6 as:

<−100, −200, −100, +100, +200, +100> (2)

The telemetry data is encoded onto the conductors 1-6 as:

<+10, 0, −10, +10, 0, −10>. (3)

Because the eigenvectors used to encode the auxiliary power, instrument power and telemetry data are orthogonal to each other, the auxiliary power, instrument power and telemetry data may be simultaneously transmitted uphole and/or downhole, on the same conductors 1-6, with minimal interference between the auxiliary power, instrument power and telemetry data.

Referring now to the downhole equipment 540 shown in FIG. 3B, the transformers T6A, T6B are used to extract telemetry data off of the conductors 1-6, and the telemetry data is provided to the modem 39. The transformers T3, T4 are used to extract instrument power off of the conductors 1-6, and the instrument power is provided to the instrument power repository at nodes 594, 596. The voltage of the auxiliary power is provided to the nodes 590, 592 (i.e., the auxiliary power repository). Due to a variety of factors, the voltages extracted downhole may not be the precise voltages applied on the conductors 1-6 at the surface. For instance, in at least some embodiments, the cable 20 (and thus the conductors 1-6) may be over five miles in length. Conductors of such a length may cause considerable signal attenuation between the surface equipment 498 and the downhole equipment 540. However, even if the voltages extracted downhole are not the same as the voltages applied at the surface, the voltages extracted downhole still are proportional to the voltages applied at the surface.

For example, the telemetry data may be encoded on conductors 1-6 at voltages of +10V, 0V, −10V, +10V, 0V and −10V, respectively. Due to attenuation, the telemetry data extracted downhole on conductors 1-6 may be +5V, 0V, −5V, +5V, 0V, −5V. Although each of the voltages on conductors 1-6 has attenuated, the voltage on each conductor has attenuated in proportion to the voltages on the other conductors, since each of the conductors between the surface equipment 498 and the downhole equipment 540 are subjected to similar conditions (e.g., length of conductors). As long as these proportions, or ratios, are maintained during surface-to-downhole or downhole-to-surface transmission, then the signals may be extracted using the reverse process that was used to encode the signals. The specific extracted voltages cannot be determined without taking into account various factors (e.g., temperature, length of conductors, type of iron used in transformer windings, turns ratios, signal frequency). Regardless, the voltages that are extracted from each conductor are in proportion to the voltages encoded on the other conductors. Each of these extractions is now discussed in turn.

The ratios of the currents excited on conductors 1-6 are proportional to the ratios of the voltages imposed on the wireline conductors at the surface equipment 498. Although the three waves (i.e., auxiliary power, instrument power and telemetry data) imposed at the surface and characterized by expressions (1), (2) and (3) arrive downhole at different times, the eigenvectors corresponding to each of the expressions (1), (2) and (3) still may be used to extract the auxiliary power, instrument power and telemetry data downhole. For example, conductor 1 carries a signal that is proportional to the +250 V of auxiliary power of the first element in expression (1) (i.e., with respect to the other five elements of (1)). Superimposed on this signal is another signal proportional to the −100 V of instrument power of the first element in expression (2) with respect to the remaining five elements of (2). Superimposed on these signals is yet another signal proportional to the +10 V of telemetry data of the first element in expression (3) with respect to the remaining five elements of (3). Current proportional to the first element of each vector expression (1), (2) and (3) arrives downhole and flows into the dotted end of the winding 577, inducing a voltage across winding 579 that is the same as the voltage across winding 577. The polarity of the voltages across windings 577 and 579 are the same, since the windings 577, 579 are dotted on the same ends.

Likewise, conductor 3 carries a signal that is proportional to the +250 V of auxiliary power of the third element in expression (1), with respect to the other five elements of (1). Superimposed on this signal is another signal proportional to the −100 V of instrument power of the third element in expression (2), with respect to the other five elements of (2). Superimposed on these signals is yet another signal proportional to the −10 V of telemetry data of the third element in expression (3), with respect to the other five elements of (3). Current proportional to the third element of each vector expression (1), (2) and (3) arrives downhole and flows into the non-dotted end of the winding 578, inducing a voltage across winding 579 that is the same as the voltage across winding 578. However, the polarity of the voltages across windings 578 and 579 are opposite, since the windings 578, 579 are dotted on opposite ends. As described above, the winding 579 is excited by winding 577 with a voltage signal proportional to +250 V, upon which is superimposed a voltage signal proportional to −100 V, upon which is superimposed a voltage signal proportional to +10 V. The winding 579 is also excited by winding 578 with a voltage signal proportional to +250 V, upon which is superimposed a voltage signal proportional to −100 V, upon which is superimposed yet another voltage signal proportional to −10 V. Because the dotted ends of windings 578 and 579 are opposite, the polarity of the signal proportional to +250 V becomes −250 V; the polarity of the signal proportional to −100 V becomes +100 V; and the polarity of the signal proportional to −10 V becomes +10 V. Thus, the winding 579 is excited by both windings 577 and 578, and thus the voltages provided by windings 577 and 578 are summed when winding 579 is excited. Accordingly, the superimposed voltages of +250 V, −100 V, and +10 V from winding 577 are summed with the superimposed voltages of −250 V, +100 V and +10 V to produce:

$$+250\text{ V}-250\text{ V}-100\text{ V}+100\text{ V}+10\text{ V}+10\text{ V}=+20\text{ V}.$$

Thus, the net effect upon the winding 579 by excitations of the windings 577 and 578 is a voltage signal proportional to +20 V with respect to (3). When a similar process is repeated for the windings in transformer T6A, a net voltage proportional to +20 V is excited upon the winding 549, as should be the case since windings 549 and 579 are in parallel. As previously mentioned, the actual voltage impressed on windings 549 and 579 may not be +20 V, nor will it be the same telemetry voltage applied at the surface. Instead, the actual voltage is proportional to +20 V and to the telemetry voltage applied at the surface, with respect to telemetry eigenvector (3). The absolute, actual voltage excited across windings 549 and 579 cannot be determined without taking into account the various factors described above (e.g., temperature, length of conductors, type of iron used in windings). This voltage is then provided as input to the downhole modem 39.

Telemetry data extraction is demonstrated mathematically using the telemetry data eigenvector of Table 2. Specifically, the eigenvector <+1, 0, −1, +1, 0, −1>, used to demonstrate the encoding of telemetry data, is also used to demonstrate the extraction of telemetry data. The eigenvector is multiplied by the sum of (1), (2) and (3):

$$<+1, 0, -1, +1, 0, -1>\cdot[(1)+(2)+(3)]=+250-250-250+250-100+0+100+100+0-100+10+0+10+10+0+10=+40.$$

The sum of +40 V is divided by two, since the transformers T6A, T6B apply a total of +40 V to parallel windings 549, 579, respectively:

$$+40\text{ V}/2=+20\text{ V}.$$

Thus, the currents in windings 575, 576 combine to impress +20V on winding 549, and the currents in windings 577, 578 combine to impress +20 V on winding 579. As previously mentioned, the actual voltage impressed upon windings 549, 579 may, in some embodiments, be different from +20 V as well as the voltage applied at the surface. However, the actual voltage, the +20 V and the voltage applied at the surface are all in proportion with each other with respect to (3). The actual voltage impressed upon windings 549 and 579 cannot be determined without taking into account the various factors (e.g., temperature, length of conductors, type of iron used in windings, signal frequencies) described above.

The telemetry data extraction process described above in context of transformer T6B is now described for instrument power extraction in context of transformer T4. Currents from conductors 1 and 3, after passing through windings 577 and 578, combine to flow into the dotted end of winding 554 in transformer T4, thereby exciting a voltage in winding 518 that is proportional to the first and third elements of (1), (2) and (3). Specifically, across winding 518 appear the voltages proportional to the first elements of (1), (2) and (3) to obtain +[(+250 V)+(−100 V)+(+10 V)] and the third elements of (1), (2) and (3) to obtain +[(+250 V)+(−100 V)+(−10 V)]. Current in conductor 5 flows into the undotted end of windings 556 and 555, thereby producing a voltage across winding 518 proportional to the fifth component of (1), (2) and (3), which will have opposite polarity from the voltages across 556 and 555. Specifically, the voltage impressed across winding 518 is proportional to −[(+250 V)+ (+200 V)+0 V]−[(+250 V)+(+200 V)+0 V]. Summing the effects on winding 518 of currents flowing through windings 554, 555 and 556 produces:

+[(+250 V), (−100 V), (+10 V)]+[(+250 V), (−100 V), (−10 V)]−[(+250 V), (+200 V), 0 V]−[(+250 V), (+200 V), 0 V]= [0 V, −600 V, 0 V]

Thus, the currents in conductors 1, 3 and 5 have canceled out the telemetry and auxiliary power signals, and only the −600 V instrument power signal remains. The actual voltage impressed across the winding 518 is a voltage that is proportional to the surface instrument voltage. Transformer T3 extracts an instrument voltage proportional to −600 V in a similar manner.

The extraction of the instrument power is demonstrated mathematically by multiplying the negative of the instrument power eigenvector of Table 2 by the sum of (1), (2) and (3):

<+1, +2, +1, −1, −2, −1>·[(1)+(2)+(3)]=+250−500+ 250+250−500+250−100−400−100−100−400− 100+10−0−10−10−0+10=−1200.

Thus, a total voltage proportional to −1200 V (i.e., with respect to (2)) is applied to the windings 516, 518. However, because windings 516, 518 are in parallel, the voltage is halved:

−1200 V/2=−600 V.

Thus, the currents in windings 551-553 combine to impress a voltage proportional to −600 V on winding 516, and the currents in windings 554-556 combine to impress a voltage proportional to −600 V on winding 518. As previously mentioned, the actual voltage impressed upon windings 516, 518 may, in some embodiments, be different from −600 V as well as the voltage applied at the surface. However, the actual voltage, the −600 V and the voltage applied at the surface are all in proportion with each other with respect to (3). This −600 V is provided at the instrument power repository between nodes 594, 596. Note that multiplying the instrument power eigenvector of Table 2 by −1 is of no consequence, since it is the ratios of the eigenvector elements that are of importance.

Telemetry data may be extracted from conductors 1 and 3 using transformer T6B independent of the operation of transformer T6A. The same data may be extracted from conductors 4 and 6 using T6A independent of the operation of T6B. Likewise, instrument power may be extracted from conductors 1, 3 and 5 using transformer T4 independent of the operation of T3. The same power may be extracted from conductors 2, 4 and 6 using T3 independent of the operation of T4.

The extraction process for auxiliary power is now described. The auxiliary power repository is located at nodes 590, 592. Signals in conductors 1, 3 and 5 are summed to determine the signal entering node 590. Specifically, the first elements of (1), (2) and (3) are summed with the third elements of (1), (2) and (3) and the fifth elements of (1), (2) and (3):

[(+250 V), (−100 V), (+10 V)]+[(+250 V), (−100 V), (−10 V)]+[(+250 V), (+200 V), 0 V]= [+750 V, 0 V, 0 V]

Thus, the components for telemetry data and instrument power are eliminated, leaving only auxiliary power. The actual voltage delivered to the node 590 is proportional to +750 V with respect to (1). Similarly, signals in conductors 2, 4 and 6 are summed to determine the signal entering node 592. Specifically, the second elements of (1), (2) and (3) are summed with the fourth elements of (1), (2) and (3) and the sixth elements of (1), (2) and (3) to produce:

[(−250 V), (−200 V), (0 V)]+[(−250 V), (+100 V), (+10 V)]+[(−250 V), (+100 V), (−10 V)]= [−750 V, 0 V, 0 V]

Thus, the actual voltage delivered to the node 592 is proportional to −750 V with respect to (1).

The extraction of the auxiliary power is demonstrated mathematically by multiplying the auxiliary power eigenvector of Table 2 by the sum of (1), (2) and (3):

<+1, −1, +1, −1, +1, −1>·[(1)+(2)+(3)]=+250+250+ 250+250+250+250−100+200−100−100+200− 100+10+0−10−10+0+10=+1500.

As above, the total of +1500 V is divided by two to produce +750 V, which is proportional to the actual voltage achieved at node 590 of the auxiliary power repository with respect to (1). As previously mentioned, the actual voltage delivered to the auxiliary power repository cannot be determined without considering various other factors. However, this actual voltage is proportional to +750 V, to the auxiliary voltage applied at the surface, and to the elements of (1).

The embodiments described in context of FIGS. 3A and 3B describe operations when both of the loops 135, 246 are functional. However, as described below, if one of the loops 135, 246 fails, the surviving loop still may be used to carry power and telemetry data uphole and/or downhole.

Referring now to FIG. 5A, both the surface equipment 498 of FIG. 3A and the downhole equipment 540 of FIG. 3B are shown in detail. Specifically, the surface and downhole equipment in FIG. 3A is configured to continue power and data transmission on loop 135 when loop 246 has failed.

When any of the conductors 2, 4, 6 begins to leak, develops an open-circuit or incurs some other problem that prevents proper function, the loop 246 is said to have failed. When the loop 246 fails, the transformer T1 is isolated from the AC power supply 510 and the transformer T5A is isolated from the telemetry device 530. The conductors 4 and 6 are electrically cut off from the switch 501 by switch 1400. The switch 1400 is not specifically shown in FIG. 3A, but nevertheless is present in at least some embodiments. The switch 501 is moved to the "3" position, so that conductor 2 is coupled to ground and thus is coupled to armor, since armor is also coupled to ground. An additional switch 1430 is also shown coupled between conductor 5 and the pair of conductors 1, 3. This switch 1430 remains closed.

Figure 5B:
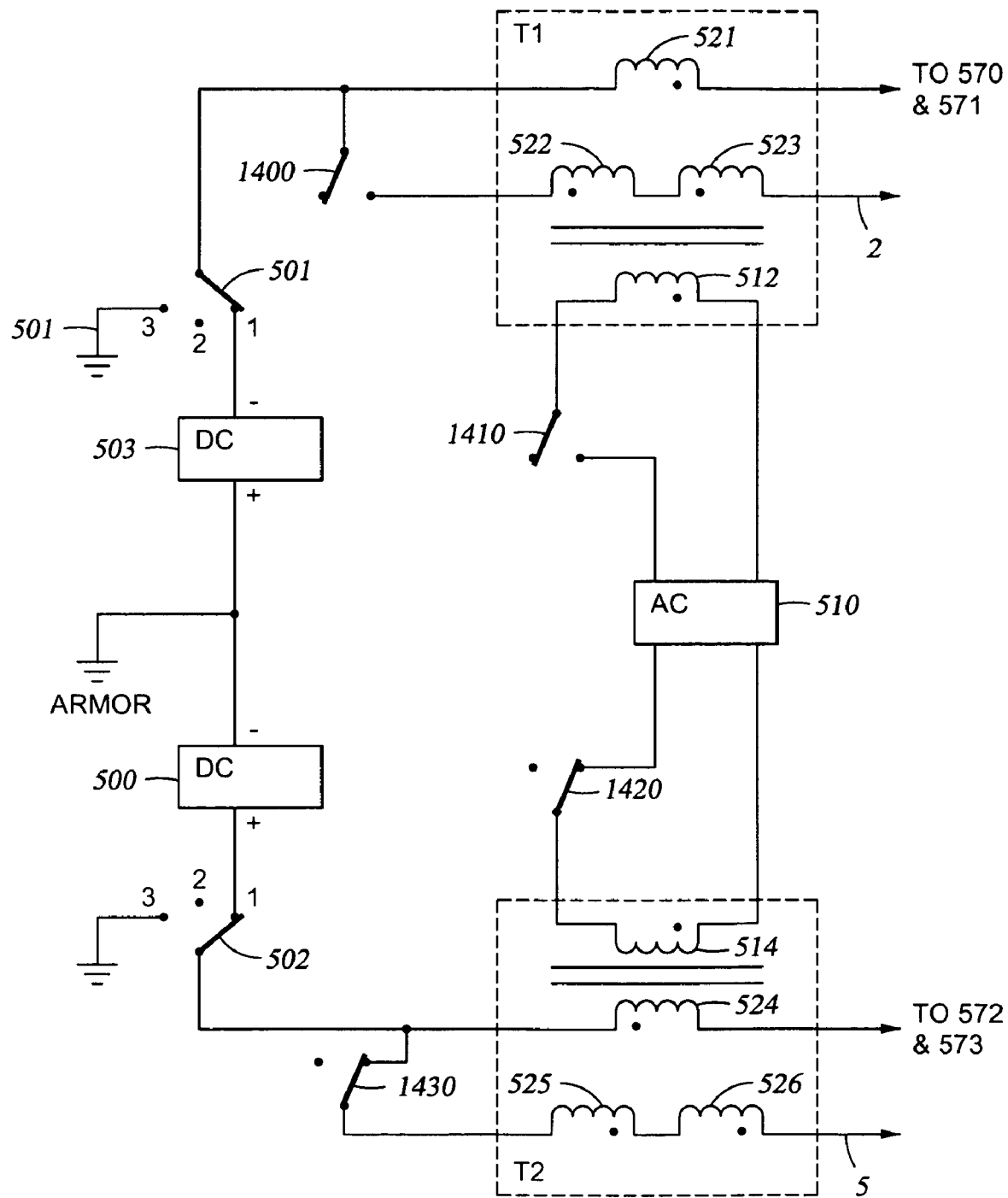

The transformer T1 is isolated from the AC power supply 510 as shown in FIG. 5B. FIG. 5B shows the AC power supply 510, the transformers T1 and T2, and the power supplies 500, 503 in detail. Although not specifically shown in FIG. 3A, a plurality of switches may be present between the AC power supply 510, the transformers T1, T2, and the power supplies 500, 503. Specifically, besides the switches shown in FIG. 5A, there is an additional switch 1410 between transformer T1 and the AC power supply 510, and a switch 1420 between the AC power supply 510 and the transformer T2. By opening switch 1410, the AC power supply 510 no longer provides voltage to the winding 512, and because no voltage is provided to winding 512, the winding 512 does not excite any of the windings 521-523 in transformer T1. The transformer T1 is thus isolated from the AC power supply 510. The switches 1400, 1410, 1420, 1430, 501 and 502 may be manually adjusted by a user at the surface. Alternatively, the switches may be controlled by a software program running on the computer 30. Other mechanisms for controlling switches are well known to one having ordinary skill in the art. The switches may comprise manually-adjusted switches, relay switches, transistors, diodes, other switching circuitry, or any combination thereof. Other means for switching are well known to one having ordinary skill in the art. Additional circuit logic may be implemented as required to operate the switches.

Figure 5C:
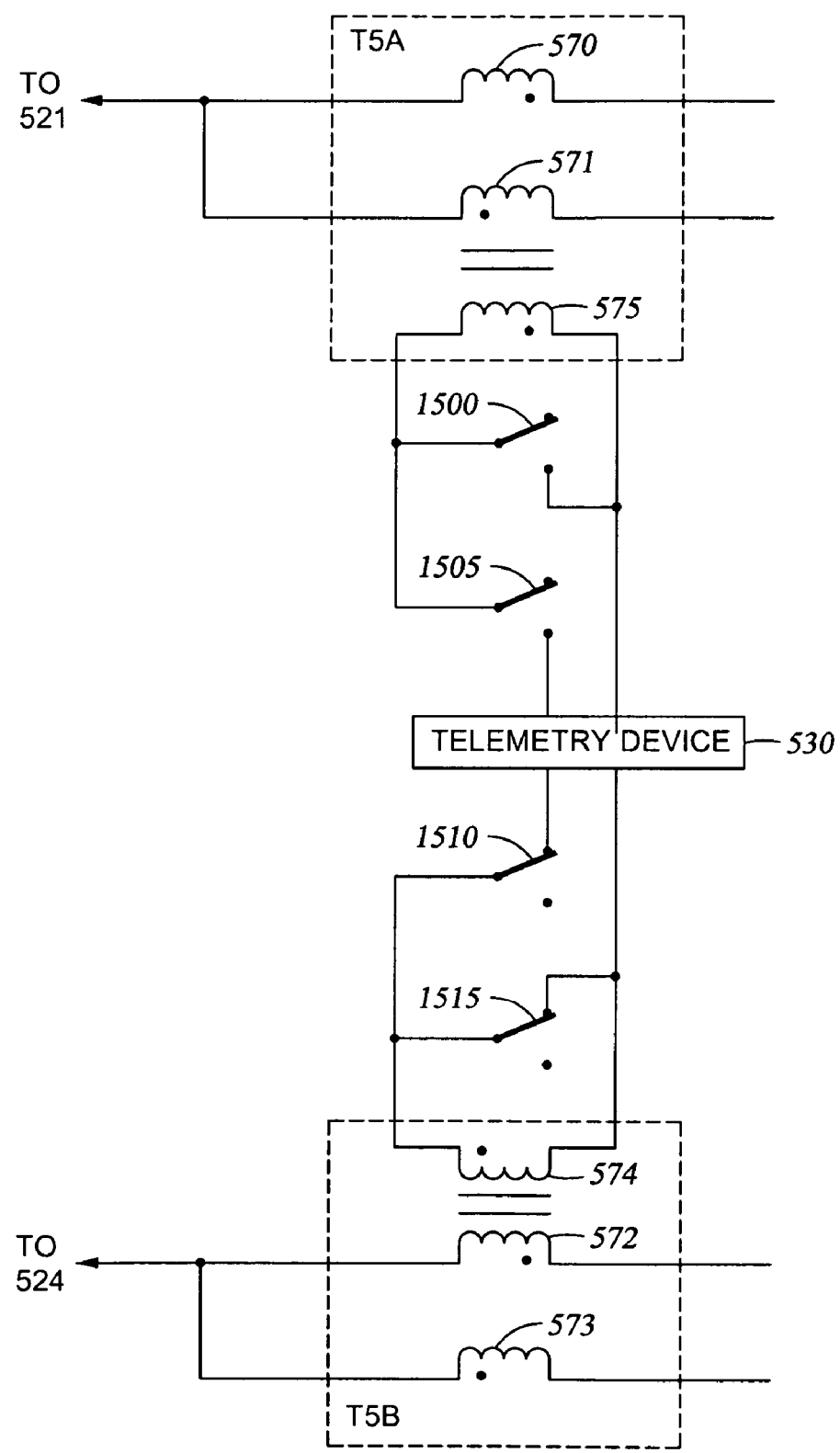

Transformer T5A is isolated from the telemetry device 530 as shown in FIG. 5C. FIG. 5C shows the telemetry device 530 and the transformers T5A and T5B in detail. Although not specifically shown in FIG. 3A, a plurality of switches may be present between the telemetry device 530 and the transformers T5A, T5B. Specifically, besides the switches shown in FIG. 5A, there are additional switches 1500, 1505 between transformer T5A and the telemetry device 530, and additional switches 1510, 1515 between the telemetry device 530 and the transformer T5B. By opening switch 1505, the telemetry device 530 no longer provides voltage to the winding 575, and because no voltage is provided to winding 575, the winding 575 does not excite any of the windings 570, 571 in transformer T5A. Moreover, closing switch 1500 short circuits the winding 575. The transformer T5A is thus isolated from the telemetry device 530. The switch 1510 is kept closed and the switch 1515 is kept open so that the winding 574 is not short circuited but instead is provided with voltage from the telemetry device 530. The voltage provided to the winding 574 is in turn excited upon the windings 572, 573 of transformer T5B. The switches 1500, 1505, 1510, 1515 may be manually adjusted by a user at the surface. Alternatively, the switches may be controlled by a software program running on the computer 30.

Thus, as shown in FIGS. 5A-5C, when the loop 246 fails, the various switches in the surface equipment 498 are adjusted so that the transformers T1, T5A are isolated and one or more of the conductors 2, 4 or 6 is coupled to ground (i.e., armor). In this way, only loop 135 is used to carry power and telemetry data uphole and downhole. Referring to FIG. 3B, coupling one of the conductors 2, 4 or 6 to ground (i.e., armor) causes node 592 to also be tied to ground. Accordingly, node 592 serves as a reference point for the auxiliary voltage provided at nodes 590, 592.

Referring now to FIG. 6A, both the surface equipment 498 of FIG. 3A and the downhole equipment 540 of FIG. 3B are shown in detail. Specifically, the surface and downhole equipment in FIG. 3A is configured to continue power and data transmission on loop 246 when loop 135 has failed.

When the loop 135 fails, the transformer T2 is isolated from the AC power supply 510 and the transformer T5B is isolated from the telemetry device 530. The conductors 1 and 3 are electrically cut off from the switch 502 by switch 1430. The switch 1430 is not specifically shown in FIG. 3A, but nevertheless is present in at least some embodiments. The switch 502 is moved to the "3" position, so that conductor 5 is coupled to ground and thus is coupled to armor, since armor is also coupled to ground. The switch 1400 is shown coupled between conductor 2 and the pair of conductors 4, 6. This switch 1400 remains closed.

Figure 6B:
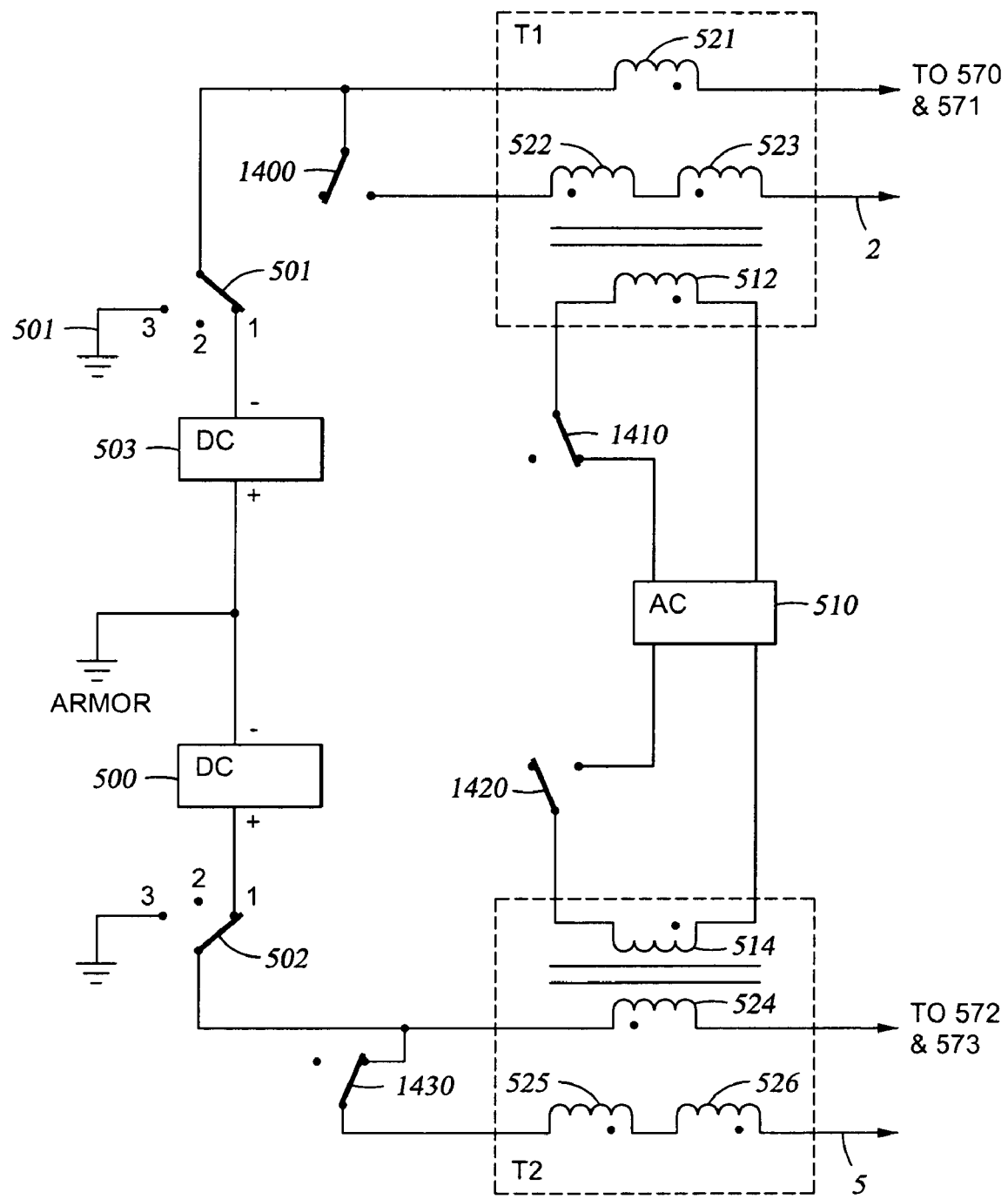

The transformer T2 is isolated from the AC power supply 510 as shown in FIG. 6B. FIG. 6B is substantially similar to FIG. 5B, except the switches are configured differently. Switch 1400 is closed and switch 1430 is open. Switch 1410 is closed and switch 1420 is open. By opening switch 1420, the AC power supply 510 no longer provides voltage to the winding 514, and because no voltage is provided to winding 514, the winding 514 does not excite any of the windings 524-526 in transformer T2. The transformer T2 is thus isolated from the AC power supply 510.

Figure 6C:
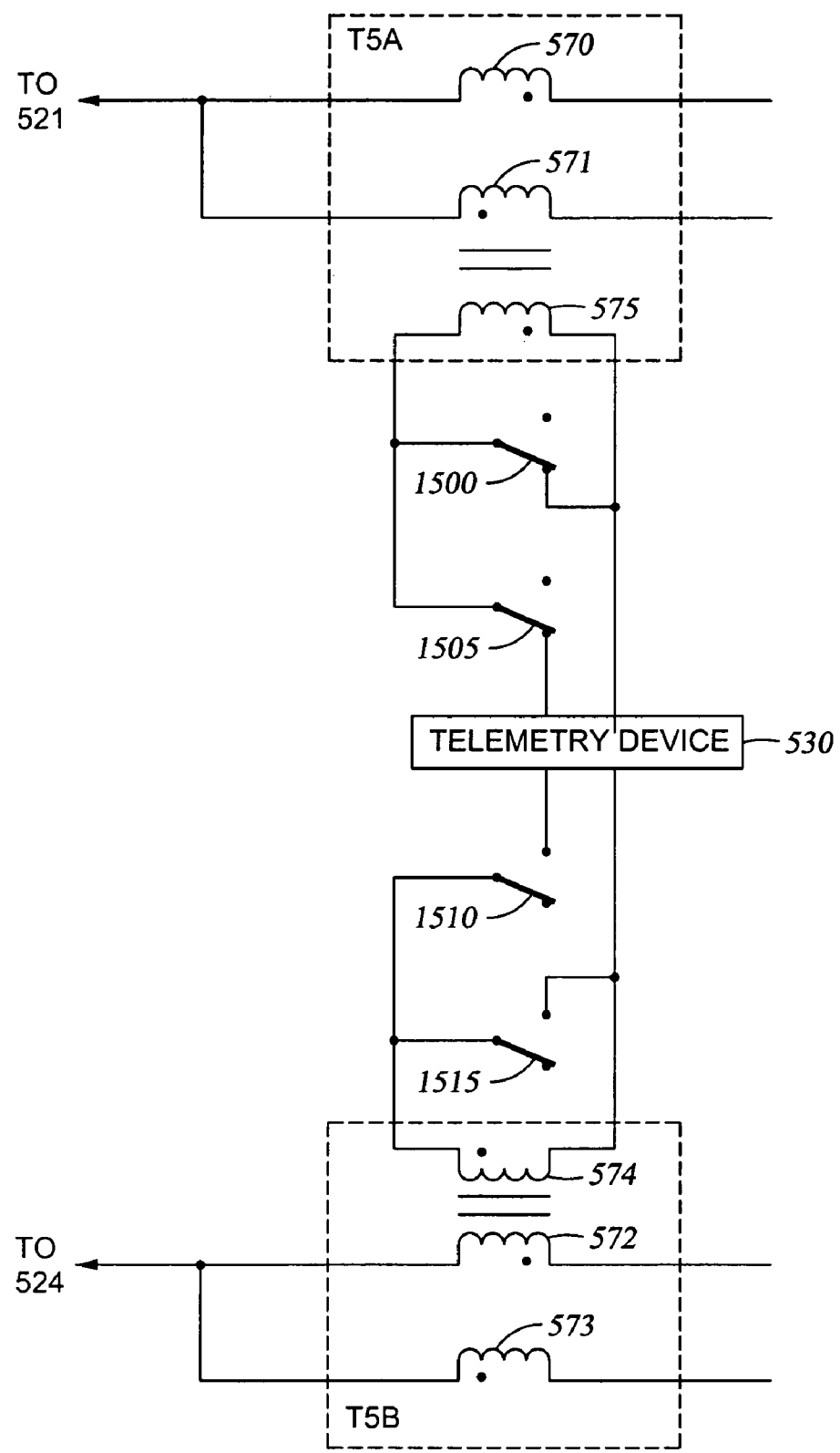

Transformer T5B is isolated from the telemetry device 530 as shown in FIG. 6C. FIG. 6C is substantially similar to FIG. 5C, except the switches are configured differently. Switches 1500, 1510 are open and switches 1505, 1515 are closed. By opening switch 1510, the telemetry device 530 no longer provides voltage to the winding 574, and because no voltage is provided to winding 574, the winding 574 does not excite any of the windings 572, 573 in transformer T5B. Moreover, closing switch 1515 short circuits the winding 574. The transformer T5B is thus isolated from the telemetry device 530. The switch 1505 is kept closed and the switch 1500 is kept open so that the winding 575 is not short circuited but instead is provided with voltage from the telemetry device 530. The voltage provided to the winding 575 excites the windings 570, 571 of transformer T5A.

Thus, as shown in FIGS. 6A-6C, when the loop 135 fails, the various switches in the surface equipment 498 are adjusted so that the transformers T2, T5B are isolated and one of the conductors 1, 3 or 5 is coupled to the armor by way of ground. In this way, only loop 246 is used to carry power and telemetry data uphole and/or downhole. Referring to FIG. 3B, coupling one of the conductors 1, 3 or 5 to ground (i.e., armor) causes node 590 to also be tied to ground. Accordingly, node 590 serves as a reference point for the auxiliary voltage provided at nodes 590, 592.

Figure 7A:
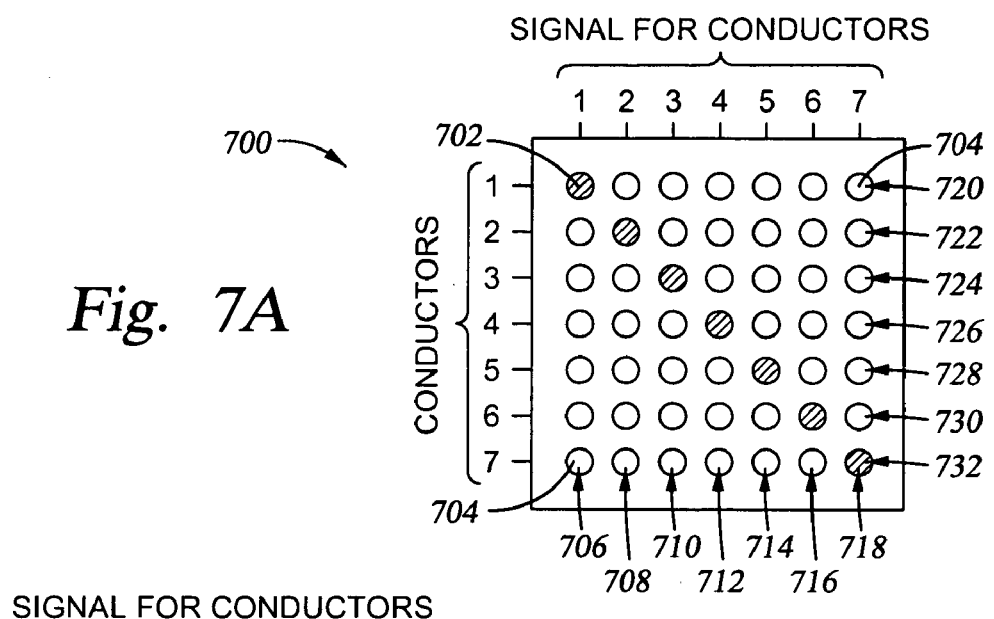
FIGS. 7A-7C show a switch matrix in accordance with embodiments of the invention.

In at least some embodiments, a failed loop may be isolated using an alternate switching mechanism. FIG. 7A shows an illustrative embodiment of a switch matrix 700. The switch matrix 700 is used to couple the transceiver 28 to the cable 20 at the surface. Thus, data and/or power that is to be imposed upon any of the conductors in the cable 20 first passes through the switch matrix 700. The switch matrix 700 enables various outputs of the transceiver 28, or the surface equipment 498 in general (e.g., the power sources 500, 503, 510 and telemetry device 530) to be coupled to the various conductors 1-7. A power or data source is coupled to a conductor by inserting an electrically conductive pin 702 into a slot 704 as desired. In FIG. 7A, a clear slot 704 indicates the absence of a pin 702 and a shaded slot 704 indicates the presence of a pin 702. The slots 704 are arranged in rows and columns. In the embodiment shown in FIG. 7A, the seven columns 706-718 of the switch matrix are provided with signals that are intended for conductors 1-7, respectively. For instance, slots in column 714 are provided with signals from power sources 500 and 510, since column 714 corresponds with conductor 5, and conductor 5 receives signals from power sources 500 and 510. The seven rows 720-732 are coupled to conductors 1-7, respectively. Thus, because the column 714 is provided with signals appropriate for conductor 5, a pin 702 is inserted in the slot 704 that corresponds with both column 714 and row 728. Similarly, because the signal provided to column 706 should be transferred to conductor 1, a pin 702 is inserted into the slot 704 corresponding to both column 706 and row 720. The configuration shown in FIG. 7A corresponds to that which is used when both loops 135 and 246 are operational.

Figure 7B:
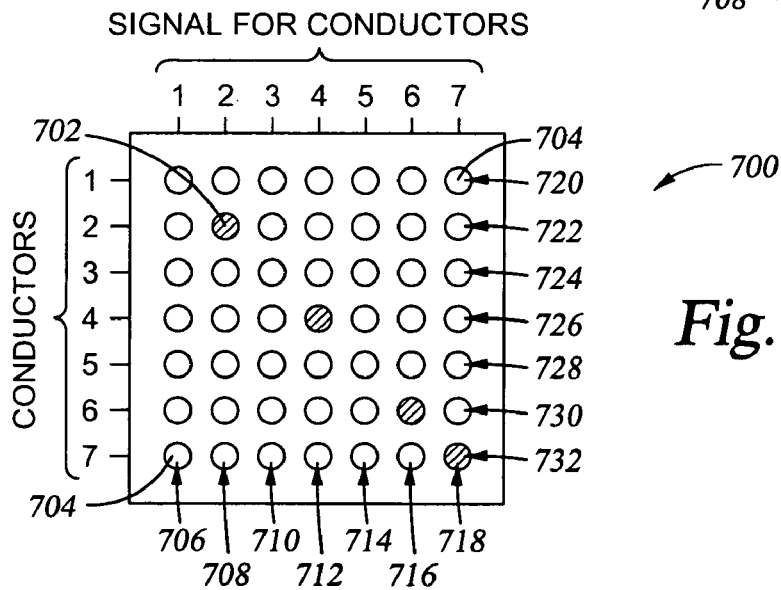
Figure 7C:
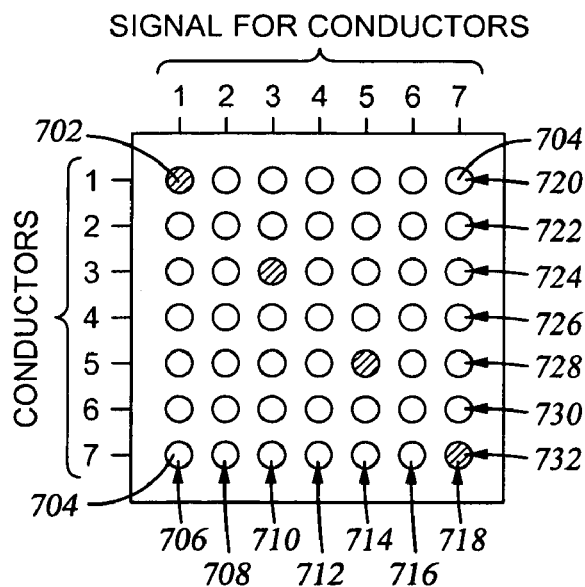

If loop 135 fails, then the pins 702 corresponding to conductors 1, 3 and 5 are removed, as shown in FIG. 7B. In this way, the loop 135 is isolated The pins corresponding to the other conductors are left in place. Similarly, if loop 246 fails, then the pins 702 corresponding to conductors 2, 4 and 6 are removed, as shown in FIG. 7C. In this way, loop 246 is isolated. The pins corresponding to the other conductors are left in place.

Figure 8:
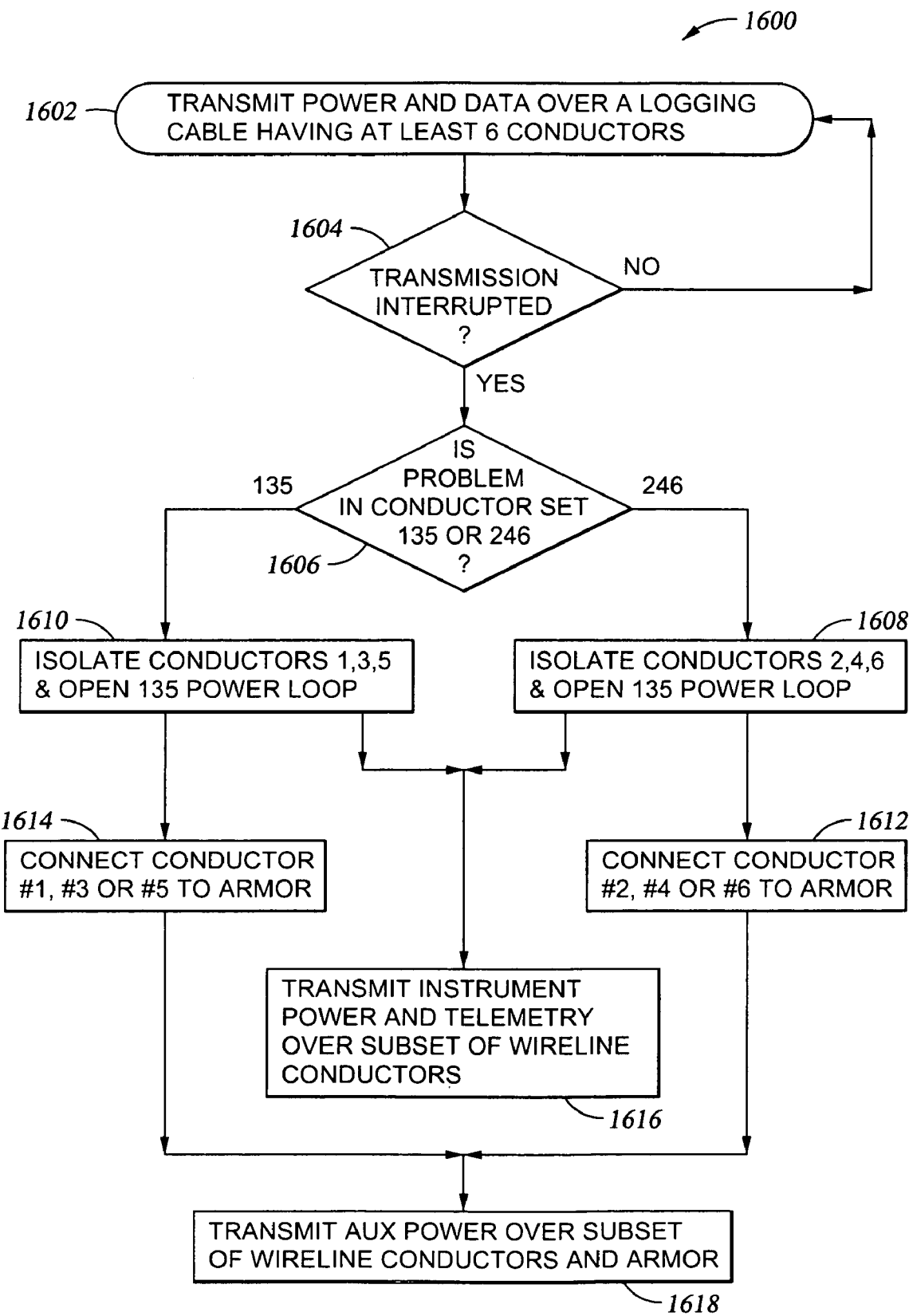
FIG. 8 shows a flow diagram of a method in accordance with embodiments of the invention.

FIG. 8 shows a flow diagram of a process 1600 in accordance with embodiments of the invention. The process 1600 begins by transmitting auxiliary power, instrument power and telemetry data over a logging cable comprising six conductors (block 1602). The loops 135, 246 are continuously monitored (e.g., by the computer 30) for failure (block 1604). If a failure is detected, it is determined whether a conductor in the loop 135 has failed, or a conductor in the loop 246 has failed (block 1606). If a conductor in the loop 135 has failed, then the process 1600 comprises isolating the transformers of loop 135 and opening the loop 135 so that the loop is no longer used to carry power and telemetry data (block 1610). If a conductor in the loop 246 has failed, then the process 1600 comprises isolating the transformers of loop 246 and opening the loop 246 so that the loop is no longer used to carry power and telemetry data (block 1608). As previously explained, transformer isolation may be accomplished manually (e.g., by an operator), by the computer 30, or by additional circuit logic as with relay switches, transistors, diodes, etc. Isolation may be achieved using the switches of FIGS. 5A-5C and 6A-6C, or by using the switch matrix 700. In either case, the process 1600 further comprises transmitting instrument power and telemetry data over the loop that is still functional (block 1616). For example, if the loop 246 fails and is opened, then the loop 135 is used in block 1616.

In case the loop 135 fails (block 1610), the process 1600 comprises coupling one or more of conductors 1, 3 or 5 to ground (i.e., armor) (block 1614). In case the loop 246 fails (block 1608), the process 1600 comprises coupling one or more of the conductors 2, 4 or 6 to ground (i.e., armor) (block 1612). In either case, the process 1600 then comprises transmitting auxiliary power over the loop that is still functional and using the armor (i.e., non-functional loop) as a reference point for the auxiliary power (block 1618). In this way, the non-functional loop is not used except as a reference point for the auxiliary power. The functional loop is used to carry auxiliary power, instrument power and telemetry data.

As previously mentioned, in some embodiments the computer 30 comprises a storage medium storing computer-executable code which, when executed, causes the computer 30 or a processor in the computer 30 to monitor the loops 135, 246 for failure. If the computer 30 detects that one of the loops 135, 246 has failed, the computer-executable code causes the computer 30 to isolate the transformers of the failed loop from the auxiliary power, instrument power and telemetry data sources. For example, referring to FIGS. 5A-5C, if the loop 135 fails, then the computer-executable code may cause the computer 30 to move switch 501 to the "3" (i.e., ground) position, thereby isolating the loop 135 from the DC power source 503. The code may further cause the computer 30 to open the switch 1410, thereby isolating transformer T1 from the AC power source 510. Further still, the code may cause the computer 30 to open switch 1400, thus isolating conductors 4,6 from conductor 2 in the surface equipment 498. Further yet, the code may cause the computer 30 to close switch 1500 and to open switch 1505, thus isolating transformer T5A from the telemetry device 530. In at least some embodiments, the computer 30 alternatively may isolate the failed loop using the switch matrix 700 as described above.

If the loop 135 is repaired, the computer 30 may detect that the loop 135 is again suitable for power and data transmission and may adjust the switches 501, 1400, 1410, 1500 and 1505 so that the transformers in the loop 135 are again coupled to corresponding power and/or data sources. The computer 30 may adjust the switches of the surface equipment 498 in any suitable manner. For example, if a switch comprises a transistor, the surface equipment 498 may comprise additional circuit logic (not specifically shown) which, when provided with a specific voltage from the computer 30, adjusts the state of the transistor, thus opening or closing the switch. In some embodiments, instead of adjusting the switches, pins 702 in the switch matrix 700 may be adjusted.

While preferred embodiments of this invention have been shown and described, modifications thereof can be made by one skilled in the art without departing from the spirit or teaching of this invention. The invention as described comprises various aspects, each of which may be separately patentable. Thus, the embodiments described herein are exemplary only and are not limiting. Many variations and modifications of the system and apparatus are possible and are within the scope of the invention. A communication cable with more or fewer conductors could be employed, although the principles of symmetry should still be employed. Where elements are described as identical, elements may instead be employed that are only substantially similar (i.e., similar enough so that the system remains operable). Accordingly, the scope of protection is not limited to the various embodiments described herein, but is only limited by the claims which follow, the scope of which shall comprise all equivalents of the subject matter of the claims.

What is claimed is:

1. A transmission system between a voltage source and a wireline tool, comprising:
 a first loop to transmit a signal between the voltage source and the wireline tool, said first loop having a first transformer coupled to said voltage source; and
 a second loop, electrically independent of the first loop, to transmit the signal between the voltage source and the wireline tool, said second loop having a second transformer coupled to said voltage source;

wherein, if the first loop fails, the first transformer is isolated from the voltage source.

2. The transmission system of claim 1, wherein said voltage source is selected from the group consisting of an alternating current (AC) source and a data source.

3. The transmission system of claim 1, wherein the first and second loops are housed in a cable, each of the loops comprising conductors that are located substantially the same distance from the center of the cable.

4. The transmission system of claim 1, wherein each of the first and second loops is for simultaneous transmission of power and data.

5. The transmission system of claim 1, wherein each of the first and second loops is powered by a dedicated voltage source.

6. The transmission system of claim 1, wherein, if the first loop fails, the first loop is used as a reference node for a voltage provided on the second loop.

7. The transmission system of claim 1 further comprising a computer coupled to the first transformer, wherein the computer detects failure of the first loop and isolates the first transformer from the voltage source.

8. The transmission system of claim 1, wherein the first transformer is isolated from the voltage source using a switch matrix.

9. A system for transmitting power between a voltage source and a wireline tool, comprising:

a first transmission loop coupled to the voltage source by way of a first transformer;

a second transmission loop electrically independent of the first transmission loop and coupled to the voltage source by way of a second transformer; and a switch, coupled to the first transmission loop, that de-couples the first transformer from said voltage source if said first transmission loop fails.

10. The system of claim 9 further comprising a computer that monitors the first transmission loop for failure and adjusts said switch if the first transmission loop fails.

11. The system of claim 9, wherein the voltage source is selected from the group consisting of an alternating current (AC) source and a data source.

12. The system of claim 9, wherein at least one of the first and second transmission loops simultaneously transmits power and data.

13. The system of claim 9, wherein the switch is selected from the group consisting of a manually-activated switch, a relay switch, a transistor, a switch matrix and a diode.

14. The system of claim 9, wherein each of the first and second transmission loops is coupled to a dedicated power source.

15. The system of claim 9, wherein the first transmission loop is used as a reference node for a voltage provided on the second transmission loop if the first transmission loop fails.

16. A method of transmitting power between a power source and a wireline tool, comprising:

transmitting power over a first transmission loop and over a second transmission loop electrically independent of the first transmission loop, the first transmission loop coupled to the power source by way of a first transformer and the second transmission loop coupled to the power source by way of a second transformer;

monitoring said transmission loops for failure; and if said first transmission loop fails, isolating the first transformer from said power source.

17. The method of claim 16, wherein isolating the first transformer from said power source comprises adjusting a switch coupled to said first transformer.

18. The method of claim 17, wherein adjusting said switch comprises using a switch selected from the group consisting of a manually-activated switch, a relay switch, a switch matrix, a transistor and a diode.

19. The method of claim 16, wherein the power source is selected from the group consisting of an alternating-current (AC) source and a data source.

20. The method of claim 16, wherein transferring power comprises simultaneously transferring different power signals on at least one of the first and second transmission loops.

21. A system for transmission between a power source and a wireline tool, comprising:

first and second transmission loops, the first transmission loop coupled to the power source by way of a first transformer and the second transmission loop coupled to the power source by way of a second transformer, said second transmission loop electrically independent of the first transmission loop;

means for monitoring said transmission loops for failure; and means for isolating the first transformer from said power source if said first transmission loop fails.

22. The system of claim 21, wherein said means for isolating comprises a switch.

23. The system of claim 21, wherein said means for isolating comprises a switch selected from the group consisting of a manually-activated switch, a relay switch, a switch matrix, a transistor and a diode.

24. The system of claim 21, wherein said means for monitoring comprises a computer.

25. The system of claim 21, wherein at least one of the first and second transmission loops simultaneously transmits different power signals.

26. A computer-readable medium storing computer code which, when executed, causes a processor to perform a method comprising:

transmitting power over a first transmission loop and over a second transmission loop electrically independent of the first transmission loop, the first transmission loop coupled to the power source by way of a first transformer and the second transmission loop coupled to the power source by way of a second transformer;

monitoring said transmission loops for failure; and if said first transmission loop fails, isolating the first transformer from said power source.

27. The computer-readable medium of claim 26, wherein isolating the first transformer from said power source comprises providing a signal that causes a switch to open, said switch coupled between the first transformer and the power source.

28. The computer-readable medium of claim 27, wherein the switch is selected from the group consisting of a relay switch, a transistor and a diode.

* * * * *